(12) United States Patent
Pai et al.

(10) Patent No.: US 11,680,447 B2
(45) Date of Patent: Jun. 20, 2023

(54) POWER CONDITIONING SYSTEM FOR PULSE POWER DRILLING

(71) Applicant: Halliburton Energy Services, Inc., Houston, TX (US)

(72) Inventors: Nagaraja K. Pai, Lancaster, PA (US); Ana Beatriz Martins Aguiar, Rio de Janeiro (BR); Camila Elias Almeida, Rio de Janeiro (BR); Boguslaw Wiecek, Kingwood, TX (US); Diego Pereira Dias, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/454,432

(22) Filed: Nov. 10, 2021

(65) Prior Publication Data

US 2022/0195806 A1 Jun. 23, 2022

(30) Foreign Application Priority Data

Dec. 23, 2020 (BR) .......................... 1020200265466

(51) Int. Cl.
*E21B 7/15* (2006.01)
*E21B 41/00* (2006.01)
(Continued)

(52) U.S. Cl.
CPC ............ *E21B 7/15* (2013.01); *E21B 41/0085* (2013.01); *E21B 4/04* (2013.01); *H02J 7/345* (2013.01);
(Continued)

(58) Field of Classification Search
CPC .......... E21B 7/15; E21B 41/0085; E21B 4/04; H02J 7/345; H02J 2207/50;
(Continued)

(56) References Cited

U.S. PATENT DOCUMENTS 4,345,650 A * 8/1982 Wesley ................. E21B 43/003
166/177.2
5,708,337 A * 1/1998 Breit ........................ H02P 6/21
318/400.11
(Continued)

FOREIGN PATENT DOCUMENTS

| CN | 110829906 | 2/2020 |
| JP | 2017011870 | 1/2017 |
| WO | 2018201118 | 11/2018 |

OTHER PUBLICATIONS

"PCT Application No. PCT/US2021/072384, Notice of Transmittal, International Search Report and Written Opinion", dated Apr. 7, 2022, 10 pages.

*Primary Examiner* — Jonathan Malikasim
(74) *Attorney, Agent, or Firm* — Delizio, Peacock, Lewin & Guerra

(57) ABSTRACT

A power condition system is disclosed for conditioning power for charging of at least one capacitive element of a pulse power electrode, where the electrical power is received from at least one of a downhole alternator or generator. The received electrical power is rectified and controlled for both voltage and current amplitude. The electrical power is then split into two parallel square wave signals. The electrical power is then transformed, using parallel high frequency high voltage transformers, to a high voltage signal. The high voltage signals are rejoined and rectified to produce a high voltage DC signal. The DC signal is smoothed at a high capacity inductor and output via a switching element to at least one capacitive element of the pulse power electrodes.

16 Claims, 18 Drawing Sheets

(51) Int. Cl.
*H02J 7/34* (2006.01)
*H02M 3/335* (2006.01)
*E21B 4/04* (2006.01)

(52) U.S. Cl.
CPC ...... *H02J 2207/50* (2020.01); *H02M 3/33573* (2021.05)

(58) Field of Classification Search
CPC .... H02M 3/33573; H02M 1/15; H02M 3/003; H02M 7/003; H02M 1/0077; H02M 1/14; H02M 1/32; H02M 7/219; H02M 1/007
See application file for complete search history.

(56) References Cited

U.S. PATENT DOCUMENTS

| | | | |
|---|---|---|---|
| 7,843,707 B2* | 11/2010 | Chen | H02M 3/33523 363/17 |
| 8,510,090 B2* | 8/2013 | Hesse | H02P 21/16 703/13 |
| 10,060,195 B2* | 8/2018 | Moeny | E21B 17/003 |
| 2006/0191681 A1 | 8/2006 | Storm et al. | |
| 2008/0157909 A1 | 7/2008 | Chen et al. | |
| 2012/0211278 A1* | 8/2012 | Gonzalez | E21B 47/13 175/40 |
| 2016/0208602 A1* | 7/2016 | Donderici | G01V 3/20 |
| 2019/0115758 A1* | 4/2019 | Orban | H02J 9/066 |
| 2022/0307323 A1* | 9/2022 | Cammack | E21B 41/0085 |

* cited by examiner

POWER CONDITIONING SYSTEM FOR PULSE POWER DRILLING

TECHNICAL FIELD

The disclosure generally relates to earth drilling or mining and to earth drilling, e.g. deep drilling, obtaining oil, gas, water, soluble, or meltable materials or a slurry of minerals from wells.

BACKGROUND

Pulse power or electro-crushing drilling occurs when portions of formation layers in the vicinity of one or more electrodes are pulverized by the emission of high-voltage bursts of electricity. These electric impulses can cause plasma formation, vaporization of fluid within the formation strata, physical failure, and sonic destruction of the formation at the electrode(s) of the pulse power drilling assembly, which in turn can advance a borehole into and/or through layers of foundation material. Electric energy may be generated by the pulse power drilling assembly for discharge at the electrode(s) in order to advance a borehole into the formation.

BRIEF DESCRIPTION OF THE DRAWINGS

Aspects of the disclosure may be better understood by referencing the accompanying drawings.

DESCRIPTION

Figure 1:
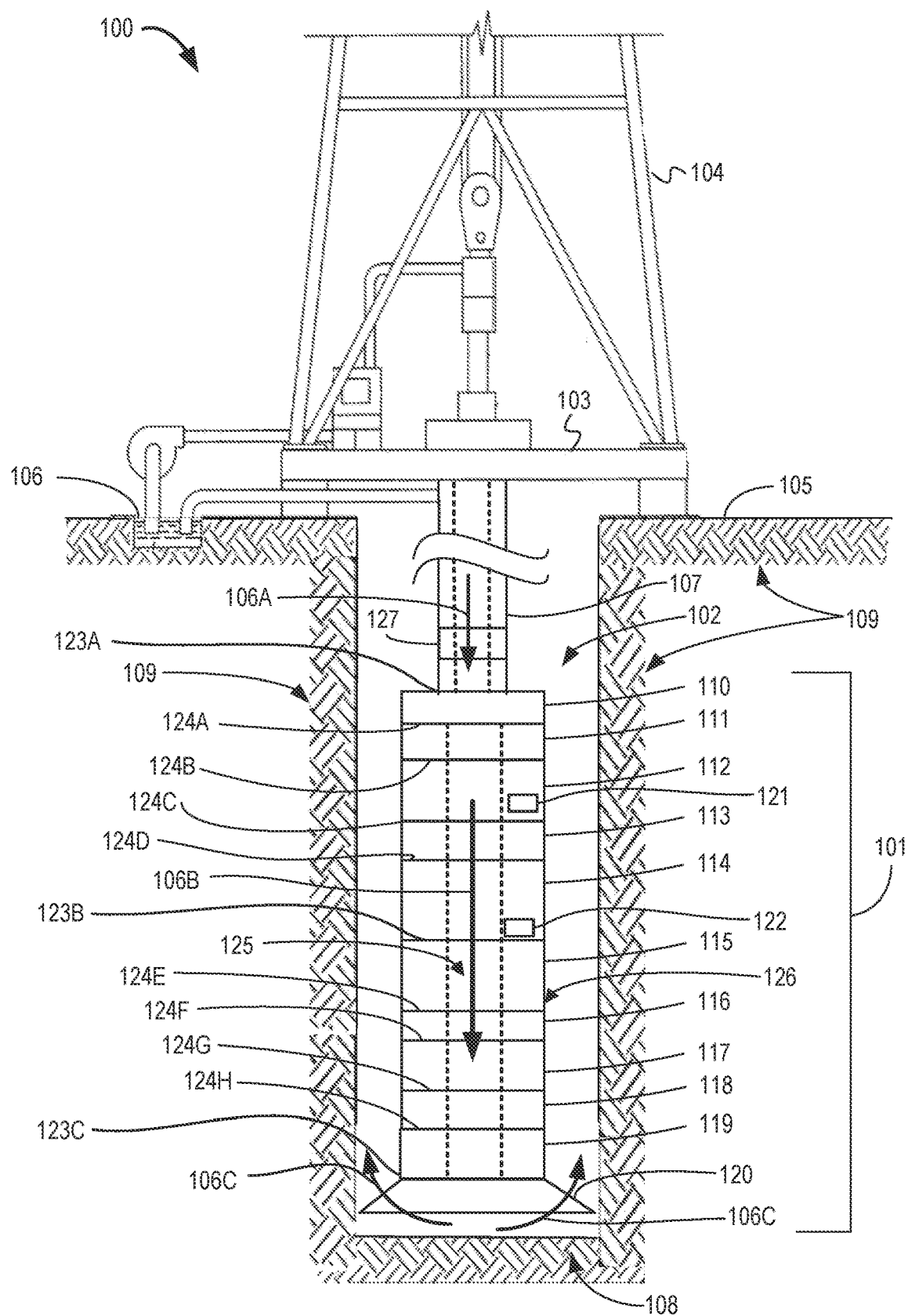
FIG. 1 illustrates a pulse power drilling system including a pulse power drilling assembly, according to various embodiments.

The description that follows includes example systems, methods, techniques, and program flows that embody aspects of the disclosure. However, it is understood that this disclosure may be practiced without these specific details. For instance, this disclosure refers to drilling fluid powered alternators and generators in illustrative examples. Aspects of this disclosure can be also applied to other alternating power sources. In other instances, well-known instruction instances, protocols, structures, and techniques have not been shown in detail in order not to obfuscate the description.

Overview

Electrical transmission from the surface to the capacitors of a pulse power drill bit can be inefficient. Pulse power drilling requires high voltage levels and significant amounts of electrical current delivered to one or more electrodes positioned at or near the bottom surface of a borehole in order to efficiently advance the borehole into or through the formation material. Generation of the required electrical energy at a location outside of the borehole, followed by transmission of the electrical to the pulsed power drilling assembly positioned within the borehole may be inefficient (due to transmission losses, grounding effects, etc.) and less safe compared to generation of electrical power downhole. Generation of the electrical power within the borehole in close proximity to a pulse power drilling assembly reduces transmission loses and improves electrical efficiency. In some embodiments, a pulsed power drilling assembly includes a turbine and alternator combination that when positioned downhole and provided with a flow of drilling fluid, is configured to generate electrical power from electrical turbines turned by a flow of drilling mud.

Embodiments of pulsed power drilling assemblies configured to generate the electrical power downhole may include a turbine and alternator combination. In various embodiments, the electrical power generated by the turbine and alternator combination requires electrical power conditioning before the electrical power is forwarded on to other sub-assemblies of the pulsed power drilling assembly, including the one or more electrodes of the assembly. In some embodiments, the turbine and alternator combined produce an output comprising one or more alternating current (AC) output waveforms. These output waveform(s) may be rectified, boosted, or transformed to a different voltage—such as a higher voltage level—and have various filtering operations performed on the waveform(s) before the conditioned electrical power is passed on to the power output and electrode(s) included in the assembly.

In various embodiments, a power conditioning system (PCS) may be provided as part of the assembly. In various embodiments, the PCS is electrically coupled to the output of the turbine and alternator combination and is configured to condition the electrical energy provided as an output from the turbine and alternator combination before providing the conditioned electrical energy as an output to the additional sub-assemblies of the assembly, including the electrode(s) of the assembly. In some embodiments, the power conditioning system includes some combination devices that may include one, some, or all of the following: an AC to DC converter, one or more induction element for power load balancing, one or more voltage protection circuits, a solid-state transformer (DC to AC converter, high voltage high frequency (HVHF), transformer, and an AC to DC converter) and one or more switches or switch banks.

Embodiments of the PCS are configured to perform the power conditioning function while being physically located within the tool body of the assembly, and to operate within the range of temperatures present and with the pressures present within tool body of the assembly while the assembly is operating downhole. Embodiments of the PCS are configured to operate safely within the voltage ranges and to safely carry the electrical current levels required to provide the conditioned electrical power needed to operate the pulse power drilling operations. One or more portions of the PCS may be designed as separable sub-assemblies themselves, which may be coupled to other sub-assemblies of the pulse power drilling assembly, for example using shop joints, in order to form the assembled pulse power drilling assembly. For example, various portions of the PCS may be manufactured by different vendors or manufactured at different manufacturing sites, and therefore be configured to couple to other portion(s) of the PCS upon final assembly of the PCS.

Example Illustrations

FIG. 1 illustrates a pulse power drilling system ("system") 100 including a pulse power drilling assembly ("assembly") 101, according to various embodiments. As illustrated in FIG. 1, assembly 101 is positioned within a borehole 102 extending into formation 109 and secured to a length of one or more sections of drill pipe 107 coupled to a drilling platform 103 and a derrick 104. In various embodiments, one or more logging tools 127 may be included as part of the sections of drill pipe 107. The assembly 101 is configured to further the advancement of the borehole 102 using pulsed electrical power generated by the assembly 101 and controllably emitted from electrode(s) 120 in order to break up formation material 108 near the bottom of borehole 102.

A source of drilling fluid 106, which may be a "mud pit" located at surface 105 and in the vicinity of the borehole 102, is coupled to various fluid conduits configured to provide a flow of drilling fluid, indicated by an arrow 106A, which is provided thorough drilling fluid conduits to the drilling pipe(s) 107 supporting assembly 101 within the borehole 102. The flow of drilling fluid 106A is further coupled to provide a flow of drilling fluid through a turbine 110 positioned at the upper portion of assembly 101. The flow of drilling fluid through turbine 110 produces mechanical rotation of the turbine, which in turn is mechanically coupled to an alternator 111 of the assembly. The mechanical rotation of turbine 110 and alternator 111 provides the energy input used by assembly 101 to generate electrical power, wherein the generated electrical power is then further processed and controllably provided to the electrodes 120 in order to perform pulse power drilling operations, including the advancement of the borehole 102.

In addition to providing the energy to mechanically rotate turbine 110 and alternator 111, in various embodiments the flow of drilling fluid passing through the turbine 110 and the alternator 111 continues to flow through one or more sections of a center flow tube 125, which thereby provides a flow path for the drilling fluid through one or more sub-assemblies of the assembly 101 positioned between the turbine 110 and the electrodes 120. This flow of drilling fluid is indicated in FIG. 1 by the arrow 106B pointing downward through the cavity of the sections of center flow tube 125. Once arriving at the electrodes 120, the flow of drilling fluid may be expelled out from assembly 101 from one or more ports or nozzles located in or in proximity to the electrodes 120. After being expelled from the assembly 101, the drilling fluid flows back upward toward the surface 105 through the annulus created between a tool body 126 of the assembly 101 and the walls forming the sides of borehole 102, as illustratively represented by arrows 106C. This flow of drilling fluid back toward the surface may aid in the removal of the debris generated by the breaking up of the formation material at and nearby the electrodes 120. In addition, the flow of drilling fluid represented by arrow 106B passing through the center flow tube 125 or otherwise flowing through passageways in one or more of the sub-assemblies included within assembly 101 may provide cooling to one or more devices and/or one or more portions of the assembly 101.

In various embodiments of assembly 101, the center flow tube 125 may be located along a central longitudinal axis of the assembly, and may have an overall outside diameter or outer shaped surface that is smaller in cross-section than the inside surface of the tool body 126 in cross-section. As such, one or more spaces are created between the center flow tube 125 and the inside wall of the tool body 126. These one or more spaces may be used to house various components, such as a rectifier controller 121, a voltage boost controller 122, and any other components, including electrical components included in the sub-assemblies of the assembly. These one or more spaces may also be used to accommodate electrical conductors, such as wires and electrical cables, that are used to transmit electrical power and/or control signals between various sub-assemblies of assembly 101. The center flow tube 125 is configured to seal the flow of drilling fluid within the hollow passageways included within the center flow tube, and at each joint (indicated by joints 124A-H, 123B-C), coupling sections of the center flow tube 125 together, in order to prevent the drilling fluid from leaking into or otherwise gaining access to these spaces between the center flow tube 125 and the inside wall of the tool body 126. Leakage of the drilling fluid outside the center flow tube 125 and within the assembly 101 may damage to the electrical components and/or other devices located in these spaces and/or may contaminate fluids, such as lubrication oils, contained within these spaces, which may impair or completely impede the operation of the assembly 101 with respect to drilling operations.

As Illustrated in FIG. 1. assembly 101 includes multiple sub-assemblies, including in some embodiments a turbine 110 and an alternator 111 positioned at the top of the assembly as described above. The turbine/alternator combination is configured to be coupled to multiple additional sub-assemblies. These additional sub-assemblies may include various combinations that may include a rectifier 112, a DC-link 113, a voltage booster 114, a pulse power controller 115, switches or switching banks (switches) 116, primary capacitors 117, a transformer 118, secondary capacitors 119, and one or more electrode(s) 120. These non-limiting examples of types of sub-assemblies may not be specifically labeled in FIG. 1, but are indicated as a stack of blocks included in the assembly 101 and extending between the turbine/alternator (110/111) and the electrode(s) 120 in the figure.

In various embodiments of assembly 101 the rectifier 112, DC-link 113, and voltage booster 114 may be referred to a "power conditioning system", or PCS. These additional sub-assemblies of the PCS may be electrically coupled to receive the electrical power output generated by the operation of alternator 111, and to provide further processing of the received electrical power in order to provide a conditioned electrical power output comprising conditioned electrical power. This further processing of the electrical power output received at the PCS may include rectification, voltage boosting, and frequency and/or waveform smoothing or regulating of the received electrical power. Additional functions that embodiments of the PCS may be configured to perform may include dynamic braking and inductive output filtering. The conditioned electrical power output provided by the PCS may be coupled, for example through field joint 123B, to additional sub-assemblies of assembly 101, which may further process the conditioned electrical power, and controllably provide the further processed electrical power to the electrode(s) 120 in order to perform various pulse power drilling operations. In various embodiments, assembly 101 includes a rectifier controller 121 configured to control the rectification functions being performed by the PCS. In various embodiments, assembly 101 incudes a voltage boost controller 122 configured to control the voltage boosting functions being performed by the PCS.

In various embodiments, assembly 101 includes some combination of additional sub-assemblies that may include switches 116, primary capacitors 117, transformer 118, and secondary capacitors 119. The combination of these sub-assemblies in various embodiments may be referred to as the "pulse power sub-assembly" or "pulse power unit". The pulse power sub-assembly may be configured to receive the conditioned electrical power output from the PCS. The primary capacitors 117 of the pulsed power sub-assembly may be configured to store this received electrical power, and wherein switches 116 may be configured to control the charging and/or discharging of the primary capacitors. Switches 116 may also be configured to controllably couple electrical power stored in the primary capacitors 117 to the primary winding(s) of transformer 118, wherein transformer 118 is configured to provide a boosted voltage output at the secondary winding(s) of the transformer. The boosted electrical power may be controllably stored (in various embodiments by operation of switches 116), by charging secondary capacitors 119. The electrical energy stored at secondary capacitors 119 may be controllably applied to electrode(s) 120, for example under the control of pulse power controller 115 and using switches 116, in order to perform various pulse power drilling operations.

As shown in FIG. 1, the individual sub-assemblies of assembly 101 may to coupled together using a set of joints (123B-C, 124A-H), wherein each of the joints is configured to couple together one or more adjacent sub-assemblies in a desired arrangement to form at least a section of assembly 101. An additional joint 123A is used to couple the assembly 101 to the sections of drill pipe 107. Joint 123A, which may be referred to as a "field joint," may be used to allow positioning of assembly 101 within the borehole 102, and to facilitate the coupling of the flow of drilling fluid 106A provided through the sections of drilling pipe 107 to the sub-assemblies of assembly 101, including the turbine 110. Embodiments of the assembly 101 may include one or more additional field joints (e.g., joints 123B, 123C), coupling various sub-assemblies of assembly 101 together. Field joints may be utilized in places where the assembly 101 could or needs to be assembled together or disassembled in the field, for example at the drill site. In addition, assembly 101 may utilize one or more joints, referred to as "shop joints", for example each of joints 124A-H in FIG. 1. These shop joints may be configured to allow various sub-assemblies of assembly 101 to be coupled together, but for example at an assembly plant or at a factory, as opposed to being assembled/disassembled in the field. The need for these shop joints may be a result of having various sub-assemblies of the assembly 101 being provided by different manufacturers, or assembled at different assembly locations, which then require assembly before being shipped out to the field or to the drill site.

Regardless of whether a joint in the assembly 101 is referred to as a field joint or a shop joint, a mechanism is provided at the joint to couple together the center flow tube 125 extending through any of the sub-assembles that include the center flow tube 125 and/or require passageways to allow for the flow of drilling fluid through the sub-assembly. This may include forming a joint between separate sections of the center flow tube 125. This may also include using a hydraulic seal capable of sealing the flow of the drilling fluid within the center flow tube 125 without allowing leaks at the joints 123B-C and 124A-H. In addition to providing a coupling of drilling fluid between sub-assemblies, one or more of the joints as described above may be configured to provide a mechanism to couple electrical power and/or electrical control signal across the joint and between adjoining sub-assemblies of the assembly 101.

In various embodiments, positioning of the assembly 101 within the borehole, for example the longitudinal positioning of the assembly within borehole, may be controlled by the derrick 104 and by controlling the number and the positioning of the sections of drill pipe 107. In various embodiments it is not necessary for the assembly 101 to be rotated as part of the pulse power drilling process, but some degree of rotation and/or oscillations of the assembly 101 may be provided in various embodiments of drilling processes utilizing the assembly 101.

Figure 2:
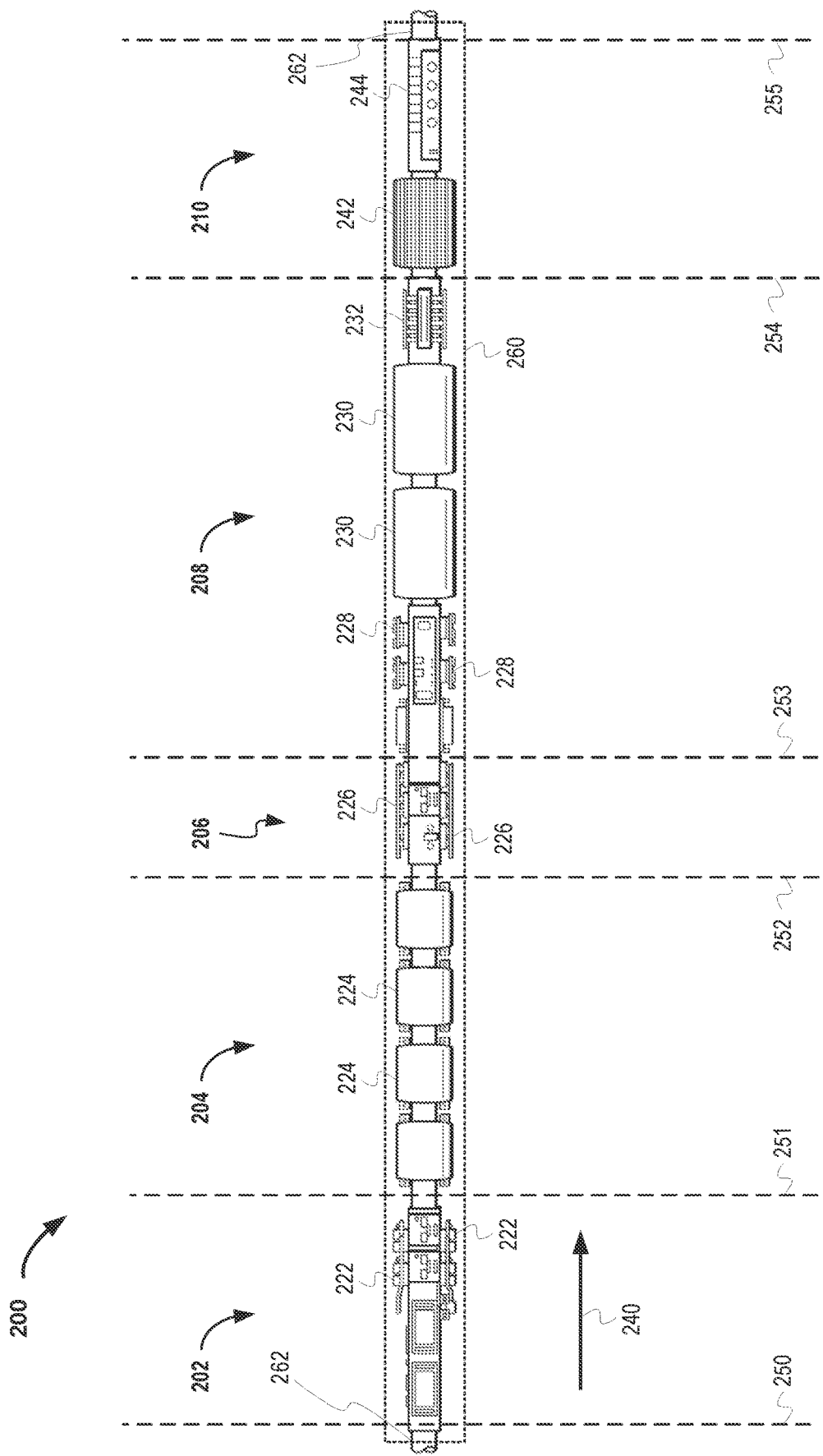
FIG. 2 illustrates a power conditioning system for use during pulse power drilling according to various embodiments.

FIG. 2 illustrates a power conditioning system ("PCS") 200 for use during pulse power drilling, according to various embodiments. Embodiments of system 200 are configured to be physically part of a pulsed power drilling assembly, the assembly including PCS 200 configured to be positioned downhole within a borehole in order to perform pulse power drilling operations. Embodiments of system 200 are configured to receive electric power generated by a turbine and alternator combination of the pulse power drilling assembly, (such as turbine alternator combination 107 and 108, as illustrated and described above with respect to FIG. 1), to electrically condition the received electrical power, and to provide a conditioned electrical output to additional modules of the pulsed power drilling assembly that include one or more electrodes. Conditioning of the electrical power that may be performed by PCS 200 may include altering or controlling one or more electrical parameters associated with the received electrical power, such as altering or providing control over but not limited to voltage, current, phase, frequency modulation/filtering, and waveform conditioning associated with the received electrical power before delivery of the conditioned electrical power to the one or more additional modules included in the pulse power assembly.

Embodiments of PCS 200 may contain a plurality of modules. As illustrated in FIG. 2, PCS 200 comprises a combination of modules that includes a front-end converter (AFEC) 202, a direct current (DC) link 204, a dynamic brake 206, a booster converter 208, and an output inductor and switch 210. As illustrated in FIG. 2, AFEC 202 comprises components positioned between dashed lines 250 and 251 DC link 204 comprises components positioned between dashed lines 251 and 252, dynamic brake 206 comprises components positioned between dashed lines 252 and 253, booster converter 208 comprises components positioned between dashed lines 253 and 254, and output inductor and switch 210 comprise components positioned between dashed line 254 and 255. The PCS 200 as illustrated in FIG. 2 is as divided into these components by dashed lines 250-255 as separate modules. However, some components of one or more of these modules may can share space, and/or components of one or more modules may overlap. In one or more embodiments the PCS 200 is part of the generator, where the generator may also include the alternator. Alternatively, in various embodiments the PCS 200 is a separate component of the pulse power drilling assembly, and is provided as a separate module that may be physically and electrically connected to the alternator at a first end and to the additional modules of the pulse power unit at a second end by respective field or shop joints. In some cases, the PCS 200 may be part of the pulse power unit.

As illustrated in FIG. 2, the modules that comprise PCS 200 are arranged along a center flow tube 262 that extends along and in various embodiments is centered around a longitudinal axis of the assembly. Center flow tube 262 may comprise a hollow passageway extending through PCS 200, wherein the center flow tube may be configured to allow a flow of drilling fluid, to be received and to pass through PSC 200 while maintaining the components of PCS 200 physically separated and isolated from the flow of drilling fluid. In various embodiments, the flow of drilling fluid through center flow tube 262 is from left to right in FIG. 2, and indicted by the direction of arrow 240. In various embodiments, the components included in the modules forming PCS 200, and any electrical conductors and/or connections configured to provide physical and/or electrical connections between the individual modules may be physically positioned in the space encircling the center flow tube 262, the space extending radially from an outer surface of the center flow tube to an inner surface of the tool body (not shown in FIG. 2) and along the longitudinal axis extending from dashed line 250 to dashed line 255. In addition to allowing for the flow of drilling fluid through PCS 200, the flow of drilling fluid through center flow tube 262 may provide thermal cooling to the components for PCS 200 through transfer of heat from the components to the flow of drilling fluid through center flow tube 262.

The components of the PCS 200 may further be immersed in or surrounded by a fluid such as a dielectric oil. An outer skin 260 or surface of the PCS is represented by a dashed line, where the outer skin defines the outer body of the tool containing the PCS 200. In various embodiments, the area between the center flow tube 262 and the outer skin 260 can be filled (partially or completely) with a fluid, such as an insulating fluid or dielectric fluid, in order to provide insulation from the tool body, from the formation, and between components, and to protect components of the PCS from physical, thermal, and electrical shock. The fluid can facilitate thermal dissipation. In various embodiments, the area between the center flow tube 262 and the outer skin 260 can be insulated or filled with one or more solids, including insulating tape, insulting wool, fiberglass insulation, etc.

As illustrated in FIG. 2, the modules of PCS 200 are arranged in order from left to right as follows: AFEC 202, DC link 204, dynamic brake 206, booster converter 208, and output inductor and switch 210. This order of modules may be referred to as the "downstream" order corresponding to the direction "downward" of the flow of drilling fluid through the center flow tube 262 as exiting PCS 200 and continuing "downward" through the pulsed power drilling assembly including PCS 200 toward the electrodes of the assembly. However, embodiments of PCS 200 are not limited to having the modules arranged in the order as illustrated in FIG. 2, and alternative embodiment of PCS 200 may have one or more modules of the PCS arranged in a different order. Additional details regarding the individual modules that may be included in PCS 200 are further described below.

In various embodiments, AFEC 202 of PCS 200 is configured to receive the raw electrical power being output from an operating alternator of the pulsed power drilling assembly where PCS 200 is located, and to provide a rectified electrical output that is coupled to DC link 204. In various embodiments, the AFEC 202 contains multiple field effect transistor (FET) 222. In various embodiments, the FETs 222 may comprise a silicon carbine (SiC) FET. SiC FETs may be selected as they may perform well for high temperature applications (such as downhole in wellbores) and for high switching frequency applications. SiC FETs also perform better than traditional Si FETs in high-power density applications (such as power conditioning). The multiple FETs 222 may be configured to switch tri-phasic or other alternating current (AC) to a rectified electrical current or currents. In various embodiments, the AFEC 202 includes additional FETs and one or more processors or controllers and memory to store program code that control the rectification functions of the AFEC 202. In various embodiments, the controller(s) or processor(s) are coupled to sensors configured to measures input voltage and current provided to the AFEC 202 from the alternator coupled to PCS 200, and to controls the FETs 222 in order to regulate the output current(s) and voltage(s) provided as an output from the AFEC 202 to the DC link 204.

In various embodiments, the AFEC 202 is configured to limit the current amplitude that flows downstream into the rest of the PCS 200, and protects circuitry from current spikes or overvoltage that may result from the operation of the alternator and turbine. The AFEC 202 is configured to receive electrical power from the alternator, and begin the process of turning the electrical power into the current and voltage accepted by the pulse power unit or other modules positioned downstream from PCS 200. In various embodiments, the AFEC 202 is configured to limit the voltage established at or sustained through to the DC link 204 to within an allowable range, so that the DC link 204 can further process the rectified electrical power provided by AFEC 202. In various embodiments, the AFEC 202 and the DC link 204 are configured to work in conjunction together to prevent frequencies in current or voltage (such as those introduced by the booster converter 208) from back-feeding from the PCS 200 to the alternator or turbine coupled to PCS 200, which are therefore protected and insulated from high frequency load shocking caused by the pulse power unit discharging cycle.

In various embodiments, the DC link 204 is configured to receive the rectified electrical output from the AFEC 202, and to provide a filtered electrical output. The filtered electrical output is various embodiments is coupled to the dynamic brake 206. In various embodiments, the DC link 204 comprises multiple capacitors 224 and an inductor. The DC link 204 is shown in FIG. 2 as a discrete module, but in some embodiments may alternatively be a part of the AFEC 202 and/or can share space with the AFEC 202.

In various embodiments, the DC link 204 is configured to store electrical energy in the multiple capacitors 224 in order to compensate for instantaneous differences in the power balance across the PCS 200. In operation, the electrical output provided by the PCS 200 to the pulse power unit downstream from PCS 200 flows to a pulsed load, where the pulse power electrodes are discharged into the formation (at a frequency such as 50 Hz). In various embodiment, the output of the AFEC 202 may comprise a first frequency, such as 40 kilohertz (kHz), while the booster converter 208 operates at a different frequency, for example 80 kHz. The alternator, which is powered by the turbine and the flow of drilling fluid, can suffer mechanical or electrical damage if the electrical power load experiences large impulse changes. The alternator, in particular, and the turbine and parts of the generator are protected from the pulsed load by the DC link 204 for mechanical loading reasons, where the DC link 204 can absorb or store excess power in the multiple capacitors 224 and the inductor. In various embodiments, the DC link 204 is configured to smooth oscillations in power, and through parallel capacitors functions as a bandpass filter to remove high frequency electrical components.

In various embodiments, the design of the DC link 204 may be affected by the downhole form factor. A form factor is a physical size limitation, in various embodiments imposed on the mechanical and electrical components of the PCS 200, where the form factor accounts for the physical size limitations of the downhole environment. The form factor of the PCS includes the size limitations imposed by the borehole and the outer skin 260 of the tool body and by the center flow tube 262. In various embodiments, the physical arrangement of the components included in PCS 200 is limited to a space having an outer diameter determined by the size of the tool body of the assembly, which can correspond to a minimum borehole diameter. The outer diameter of the tool body can also correspond to the size of the pulse power electrode(s) included as part of the pulsed power assembly, which determine the diameter of the borehole, minus a form factor allowing for the flow of drilling mud through the annulus. The PCS 200 is protected from the drilling fluid by the outer surface or skin 260. The PCS 200 also includes a center flow tube 262 through which drilling mud flows from the drill pipe to one or more outlets at the pulse power electrodes. The outer skin 260 and surface of the center flow tube 262 define an annulus, cylindrical annulus, or square toroid in which the components of the PCS 200 lie. In one or more embodiments, the surfaces of the PCS 200 are metal. In some embodiments, the surfaces where the PCS 200 contacts the drilling mud are metallic but nonmagnetic. In other embodiments, skin effects and eddy currents induced in the surfaces can cause parasitic power losses. Drilling mud suitable for use with pulse power drilling may also be conductive and experience parasitic eddy currents due to electrical and magnetic fields inside and outside of the PCS 200. The DC link 204 occupies a significant (i.e. greater than 10%) portion of the PCS 200 because of the form factor requirements on the capacitors, which occupy the annular space between the outer skin 260 and center flow tube 262 and also experience high temperature, high pressure, high voltage, and high current. These capacitors can be relatively large (as shown in FIG. 2 each of the four capacitors 224 occupies the area between the center flow tube 262 and the outer skin 260). The large and tubular nature of the DC link 204 gives rise to parasitic impedance. In order to maintain an impedance value which does not depend on flow rate or drilling mud composition, an inductor of known impedance is included in the DC link 204. The impedance is known, substantially constant and can be designed to decouple the alternator frequencies and the pulse power electrode frequencies, thereby protecting the alternator.

In various embodiments of PCS 200, the dynamic brake 206 is configured to protect the AFEC 202, the DC link 204 capacitors, and the booster converter 208 from damaging overvoltages by controllably discharging excess power over one or more resistors. In various embodiments, the dynamic brake 206 comprises one or more FETs 226, and one or more resistors. In various embodiments, the dynamic brake 206 is part of the DC link 204, and/or shares space with the DC link 204. In alternative embodiments, the dynamic brake 206 is functionally distinct but can be arranged to share physical space, processor space, or controller space with the booster converter 208 and/or switches of the booster converter 208. In various embodiments, the dynamic brake 206 is configured to detect high voltage in the filtered electrical output provided from the DC link 204. A high voltage may be a voltage, such as peak to peak voltage level, that exceeds a pre-defined maximum voltage threshold. When a high voltage condition is detected, dynamic brake 206 may be configured to switch a current flow to a resistor or other load device in order to dissipate the high voltage as thermal heat over the resistor or load device. In various embodiments, the dynamic brake 206 is configured to turn on when the power balance between the dynamic brake's inputs and outputs exceeds the capacity of the DC link 204 to store energy. In various embodiments, the dynamic brake 206 is located close to the capacitors 224 of the DC link 206 in order to reduce stray inductance along long or coiled wires, where close can include instances where the dynamic brake 206 is incorporated into a circuit board or controller of the DC link 206. The one or more FETs 226 of the DC link 206 in various embodiments may comprise SiC FETs. SiC FETs may be selected for use as components of dynamic brake 206 because these devices perform well under higher operating temperatures and experience smaller junction losses than silicon (Si) FETs, which is advantageous for high power use.

In various embodiments of PCS 200, the booster converter 208 is configured to receive electrical power from the dynamic brake 206, to boost the voltage level of the received electrical power, and to provide a boosted electrical output to the output inductor and switch 210. In various embodiments, the booster converter 208 comprises one or more FETs 228, two or more parallel solid-state transformers 230, and one or more diodes 232. In various embodiments, the booster converter 208 comprises a single active bridge (SAB), parallel DC to DC solid state transformers, and a diode bridge. These components can alternatively be considered as separate modules of the PCS 200. In various embodiments, the SAB is configured to switch an input DC current to generate two parallel high frequency square wave signals. Because transformers cannot increase voltage on a DC signal, but rather transform AC or approximately-AC voltage, the SAB generates two parallel square wave electrical outputs using multiple FETs. The creation of the two parallel square wave signals instead of a single high frequency square wave signal reduces current ripple at the output of each of the parallel transformers. Generation of the parallel signals also reduce the electrical power level carried by each individual signal, which reduces the size and overall volume required for each of the DC-to-DC solid-state transformers, thereby allowing these smaller transformers to fit within the space available and/or allocated for the booster converter 208.

In various embodiments, the center flow tube 262 of PCS 200 has a reduced cross-sectional diameter for the portion of the center flow tube extending through the booster converter 208. Alternatively, the center flow tube 262 can have a reduced cross-sectional diameter when passing through just the two or more solid-state transformers 230. A smaller cross-sectional diameter for this portion of the center flow tube 262 allows for larger solid-state transformers 230 to be utilized in order to meet minimum electrical and mechanical constraints for these components.

In various embodiments of PCS 200, the output inductor and switch 210 is configured to receive the boosted voltage output from the booster converter 208, and to provide a final electrical power output from PCS 200 that may be coupled to one or more additional modules of the pulse power drilling assembly that includes one or more electrodes. In various embodiments, the output inductor and switch 210 includes at least one output inductor 242 and at least one switch 244. In various embodiments, the output inductor and switch 210 is configured to smooth and control current and voltage delivery to the one or more additional modules of the pulsed power drilling assembly. The output inductor 242 may be configured to smooth the high voltage signal from the upstream portions of the PCS 200, and thus protect the one or more additional modules of the pulse power drilling assembly that receive electrical power from PCS 200. In various embodiments, the output inductor 242 can frequency filter the high voltage signal. In various embodiments, the at least one switch 244 is configured to couple and decouple the electrical output of PCS 200 to and from, respectively, the one or more additional modules of the pulsed power drilling assembly. In operation, when the electrical output provided by PCS 200 is charging the pulse power electrodes or one or more capacitors of the pulse power unit of the pulsed power drilling assembly, the at least one switch 244 is closed or otherwise configured to allow electrical throughput through the switch(s) 244. Once the pulse power unit is charged, the at least one switch 244 is configured to open or otherwise disconnect the final electrical output of PCS 200 from the pulse power unit. In various embodiments, the disconnection function provided by switch(s)) 224 operates to protect PCS 200, and the alternator and the turbine which are connected to the PCS 200, from load shocking and prevents the capacitors of the pulse power unit from discharging into the PCS 200.

For ease of transport, the length between field joints of the PCS 200 is less than 45'. In one or more embodiments, the PCS 200 for a prototype or field-deployed pulse power drilling apparatus processes approximately 300 kilowatts (kW) and is approximately 45' long. In one or more embodiments, the PCS 200 for an exploratory or discovery pulse power drilling apparatus process approximately 100 kW and is significantly less than 45' long. The PCS 200 is compatible with one or more types of alternators and turbines. The PCS 200 has at least one controller or processor, and in some embodiments the PCS 200 contains both an AFEC 202 controller and a PCS 200 controller, which can be in communication. The AFEC 202 controller measures the incoming current amplitude, frequency, and phase from the alternator and can adjust AFEC 202 behavior to account for differences in alternator behavior.

Figure 3:
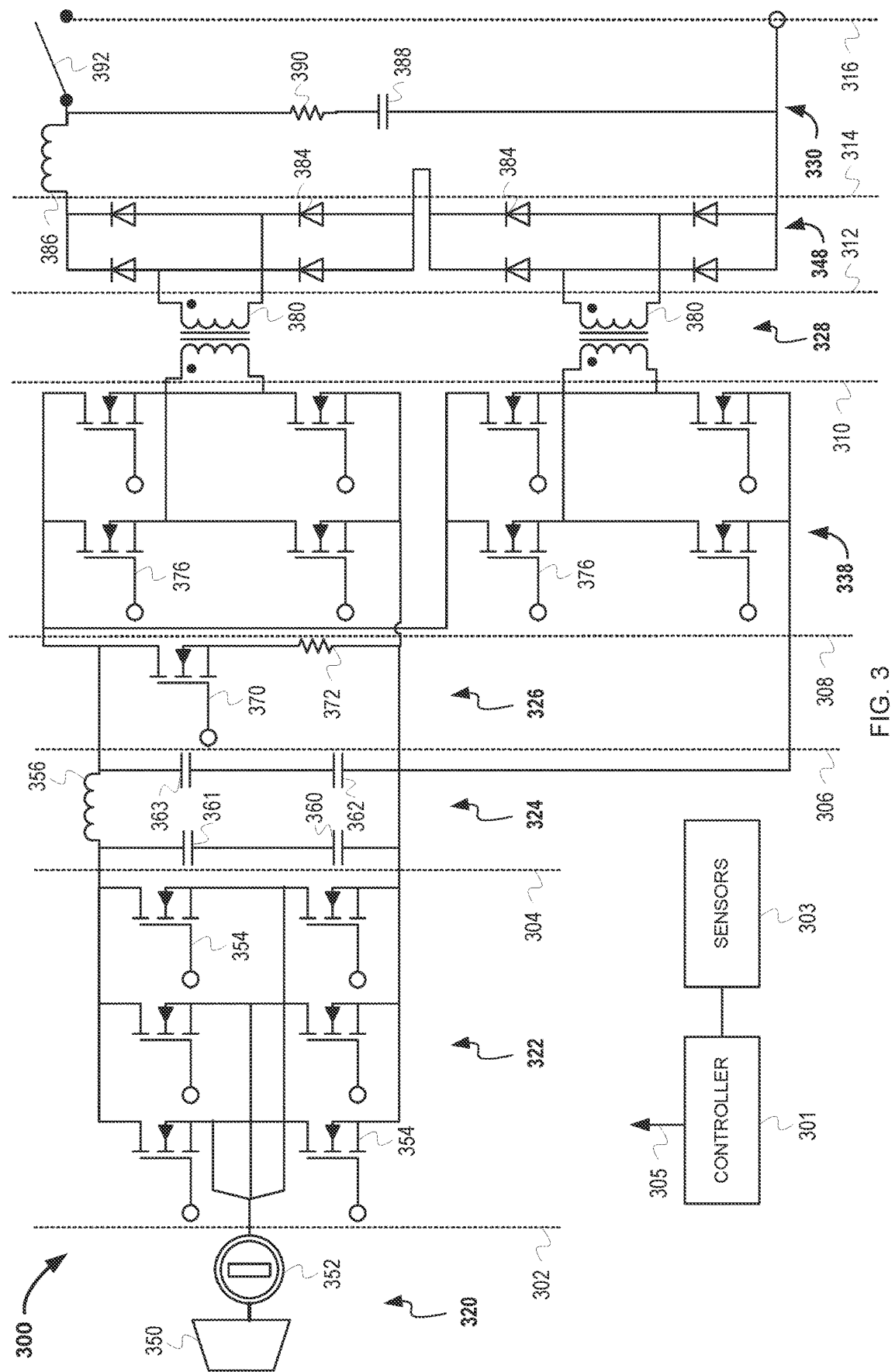
FIG. 3 depicts a circuit diagram for the power conditioning system according to various embodiments.

FIG. 3 depicts a circuit diagram 300 for a power conditioning system, according to various embodiments. Operations and components illustrated in FIG. 3 are described in reference to the embodiment(s) of the power conditioning system 200 of FIG. 2. In FIG. 3, embodiments of electrical components and circuitry are shown as divided into divided by dashed lines 302, 304, 306, 308, 310, 312, 314, and 316. In various embodiments, the circuitry illustrated in FIG. 3 included between dashed lines 302 and 304 represents an embodiment of the AFEC 202 of FIG. 2. In various embodiments, the circuitry in FIG. 3 included between dashed line 304 and 306 represents an embodiment of the DC link 204 of FIG. 2. In various embodiments, the circuitry in FIG. 3 included between dashed line 306 and 308 represents an embodiment of the dynamic brake 206 of FIG. 2. In various embodiments, the circuitry in FIG. 3 included between dashed line 308 and 310 represents an embodiment of FETs 228, the circuitry included between dashed lines 310 and 312 represents an embodiment of transformers 230, and the circuitry between dashed lines 312 and 314 represents an embodiment of the at least one diode 232, all of booster converter 208 of FIG. 2. In various embodiments, the circuitry in FIG. 3 included between dashed line 314 and 316 represents the output inductor and switch 210 of FIG. 2.

Referring again to FIG. 3, one or more of dashed lines 302, 304, 306, 308, 310, 312, 314, and 316 correspond to locations within the circuitry where example electrical signals, both input and output, are measured or simulated, as will be further discussed in reference to FIGS. 4A-4D, 5A-5B, 6A-6D, 7A-7B, 8A-8B, and 9A-9B. The example components of the circuit diagram 300 are shown as discrete elements divided into components that correspond to the AFEC 202, the DC link 204, the dynamic brake 206, the booster converter 208, and the output inductor and switch 210 of the PCS 200 of FIG. 2. However, these divisions are non-limiting, and individual electrical components, such as resistors, capacitors, FETs, controllers, processors, etc. can be shared between components or in a different order from that shown in FIG. 3. Various electrical components of FIG. 3 can instead be replaced by other components or by additional hardware, firmware, software, etc. For clarity, processors and controllers are not shown.

In FIG. 3, a controller 301, coupled to one or more sensors 303, can be configured to received signals from sensors 303, the signals indicative of one or more parameters associated with the circuitry of circuit diagram 300, and to provide one or more control output signals 305 for controlling one or more operating parameters of system 300 based at least in part of the sensor signals. Controller 301 in various embodiments is a computer system including one or more microcontrollers, such as computer system 1300 as illustrated and described below with respect to FIG. 13. In various embodiments, one or more of sensors 303 are configured to sense a voltage, a current, a temperature or some other physical parameter associated with signal(s) present at one or more nodes or portions of the circuitry included in circuit diagram 300, and to provide an output signal to controller 301 that is indicate of the sensed electrical parameter. Sensors 303 are not limited to any particular type or types of sensors and may include one or a combination of sensors configured to detect a physical parameter and to provide an output signal indicative of the measured physical parameter detected by the respective sensor(s).

FIG. 3 depicts a power generation unit 320, an AFEC 322, a DC link 324, a dynamic brake 326, a booster transformer 328 together with a SAB 338 and a diode bridge 348, and an output inductor and switch 330. In various embodiments the AFEC 322, the DC link 234, the dynamic brake 326, the booster transformer 328 with the SAB 338 and the diode bridge 348, and the output inductor and switch 330 correspond to the PCS 200 as depicted in FIG. 2. In various embodiments, the power generation unit 320 includes a turbine 350 and an alternator 352. The turbine 350 and the alternator 352 are configured to generate an electrical power output from the mechanical energy provided by a flow of drilling fluid provided to and flowing through the turbine. The turbine 350 and the alternator 352 may be individual components or a combined unit. The alternator 352 can output triphasic, biphasic, or other, including single phase alternating current electrical power output.

In various embodiments, the AFEC 322 comprises one or more FETs 354. The one or more FETs 354 function as switches configured to rectify the electrical power output provided by the power generation unit 320. Rectification performed by the AFEC 322 may include rectifying the electrical power output provided by alternator 352 into a rectified AC or a quasi-DC (i.e. square wave, sawtooth, etc.) output. For the triphasic example shown in FIG. 3, three sets of two FETs 354 are provided, each set of two FETs are coupled to one phase of the three-phase output provided by alternator 352. The FETs 354 are configured to rectify and then rejoined as the rectified AC power output—where the current is positive in amplitude but can experience two frequencies of oscillation. In various embodiments, the current can display a first frequency and a second frequency, where the second frequency can be an oscillation in the wave envelope or a pulsing frequency that occurs at a slower frequency than that of the first frequency. The AFEC 322 operates on the voltage and current emitted by the power generation unit 320, which can be measured at dashed line 302 of FIG. 3.

To illustrate, FIGS. 4A, 4B, 4C, and 4D depict graphs of alternator output, which is the active front-end converter (AFEC) current and voltage input, according to various embodiments. FIGS. 4A-4D depict graphs 400, 420, 440, and 460. Operations and components of FIG. 4A-4D are described in reference to the example PCS 200 of FIG. 2 and the circuit diagram 300 of FIG. 3.

Figure 4A:
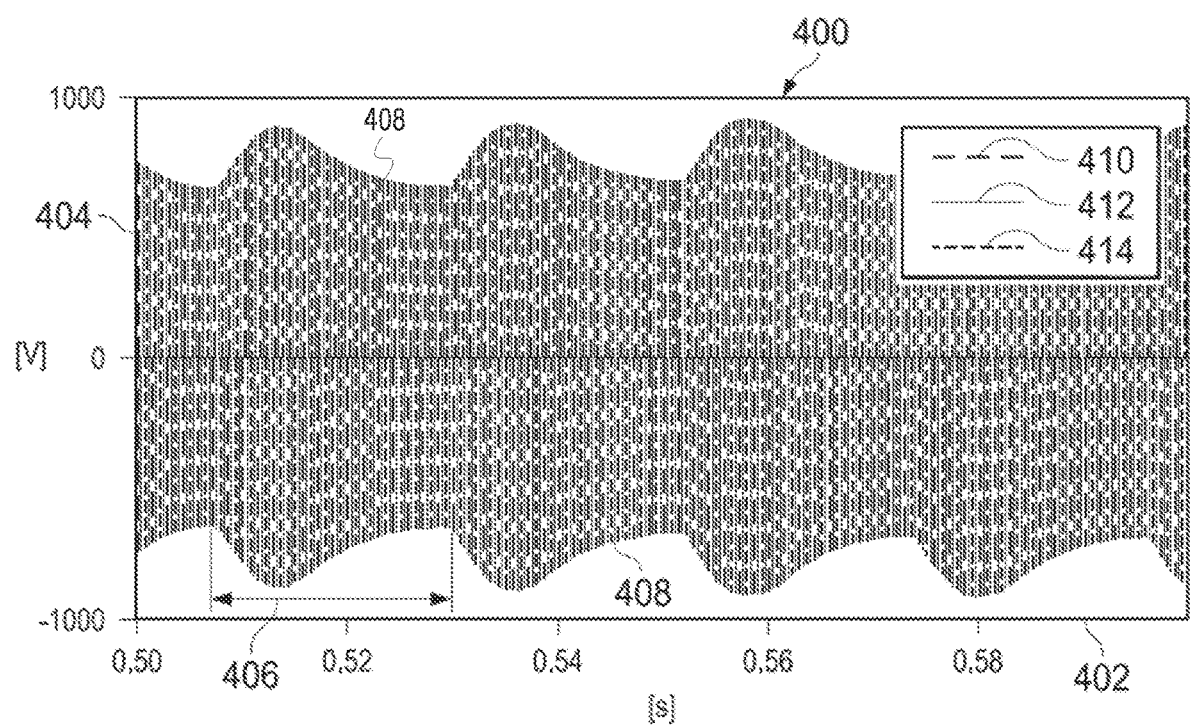
FIGS. 4A, 4B, 4C, and 4D depict graphs of alternator output, which is the active front-end converter (AFEC) current and voltage input, according to various embodiments.

FIG. 4A contains the graph 400, which shows AFEC 322 input voltage, which is approximately the output voltage of the power generation unit 320. The graph 400 shows an example voltage (as measured at the line 302 of FIG. 3) as a function of time (on x-axis 402) and voltage (on y-axis 404). The voltage displays periodicity on order of period 406, which is approximately 0.02 seconds (sec) in length. The voltage can also display periodicity at one or more other frequency, such as those related to the fundamental frequency of the alternator and/or related to the switching frequency of the AFEC, which can be smaller than the period 406. The triphasic voltage shows a $V_{ac}$ 410, a $V_{bc}$ 412, and a $V_{ca}$ 414. The differences between each of the voltage phases is also depicted in FIG. 4C. The triphasic voltage experiences two frequencies—i.e. a periodic tendency exhibited by the signal envelope 408 with the period 406 and a faster frequency shown in more detail in FIG. 4C. Voltage ranges from approximately −1000 Volts (V) to 1000 V.

Figure 4B:
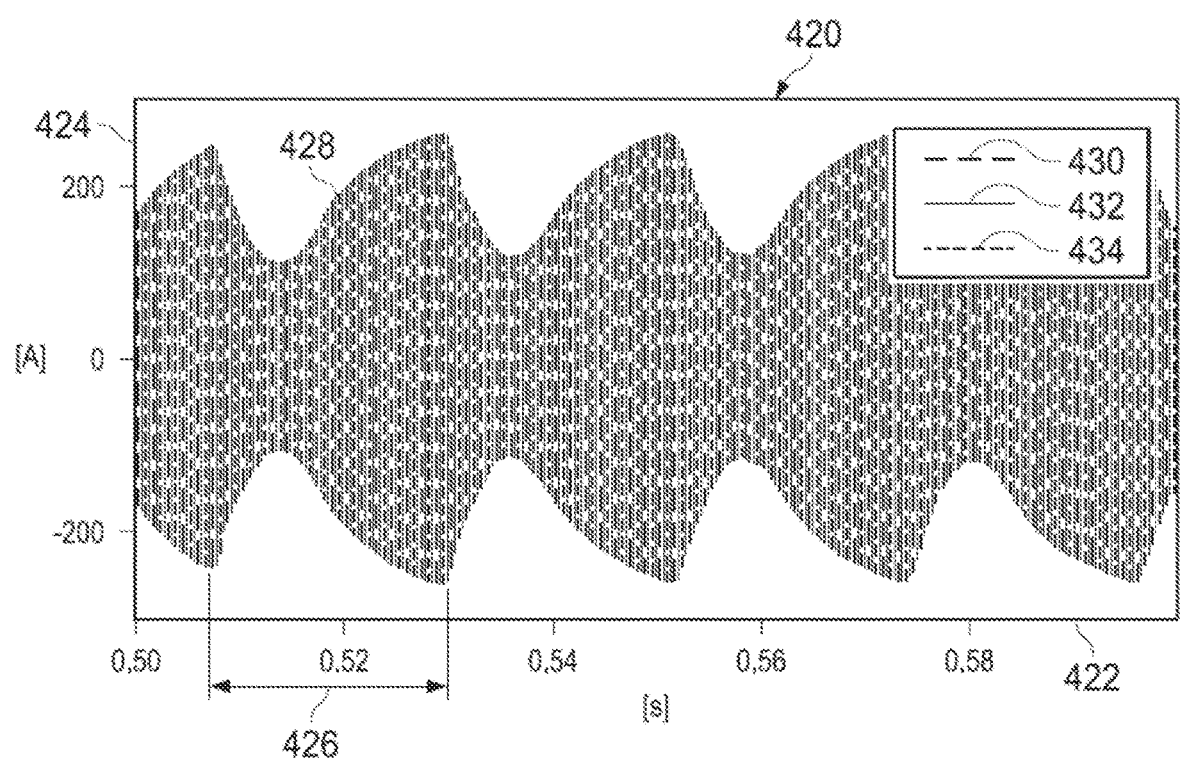
Figure 4C:
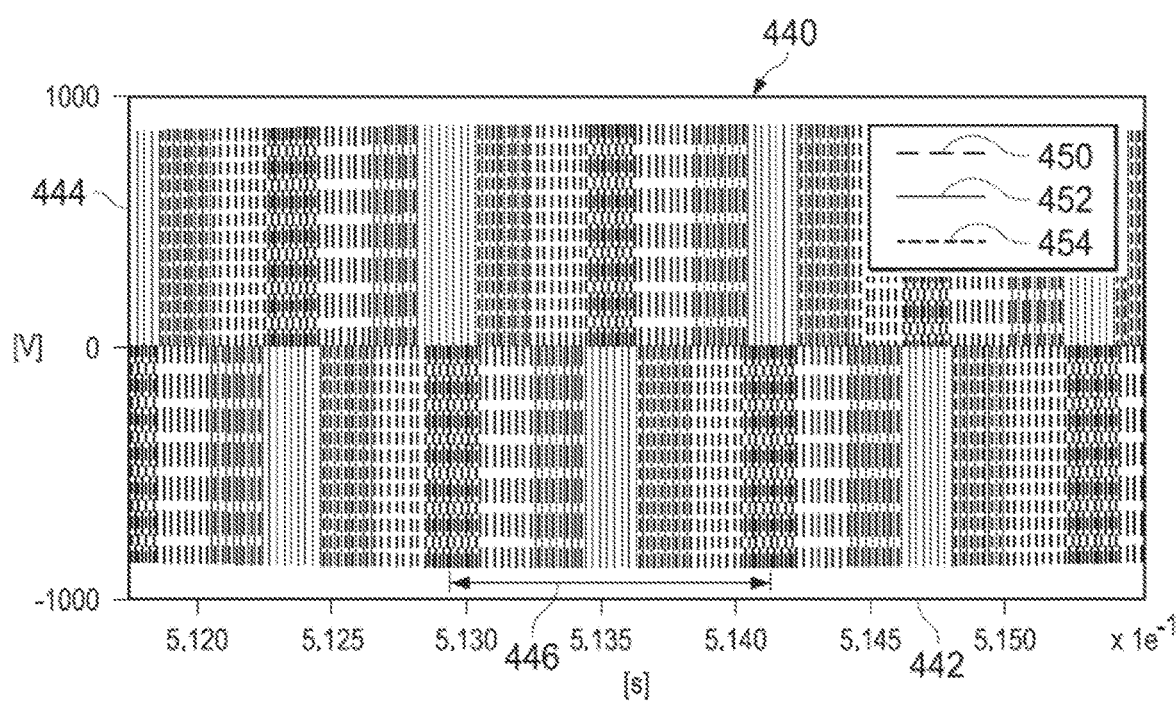
Figure 4D:
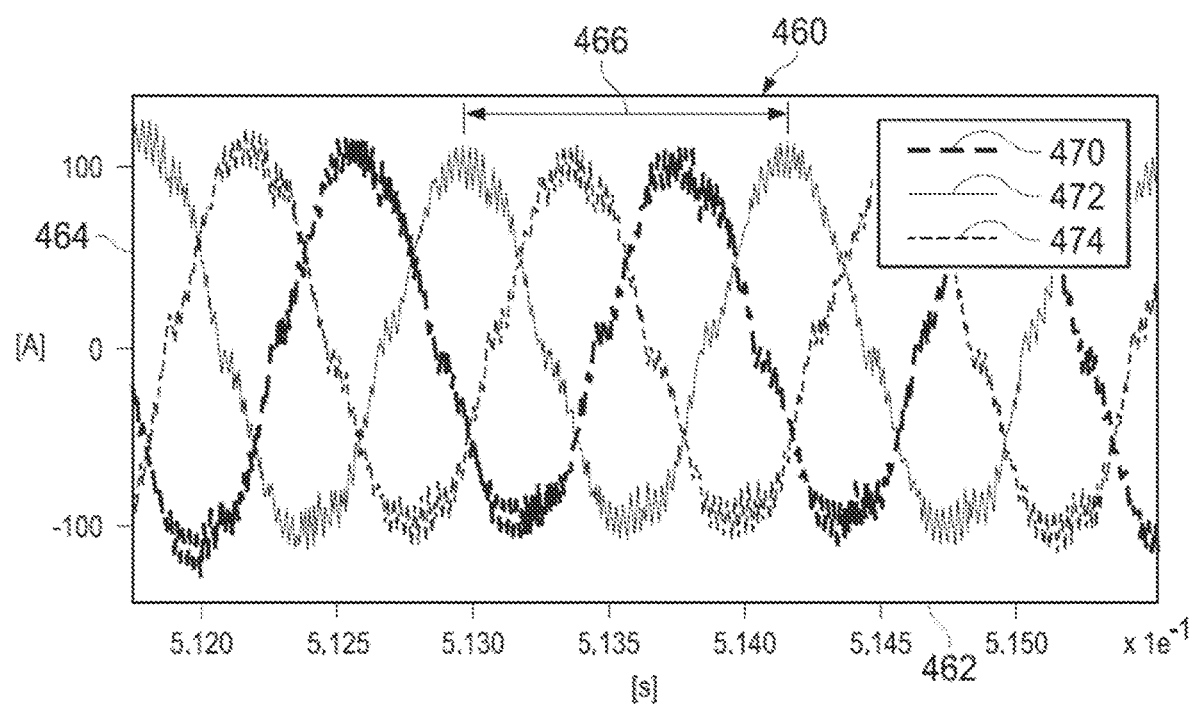

FIG. 4B contains the graph 420, which shows AFEC 322 input current, which is approximately the output current of the power generation unit 320. The graph 420 shows an example current (as measured at the line 302 of FIG. 3) as a function of time (on x-axis 422) and current (on y-axis 424). The wave envelope of the current signal displays periodicity on order of period 426, which is approximately 0.02 seconds (sec) in length. The current can also experience periodicity at multiple other frequencies, including the fundamental frequency of the alternator 352 and the switching frequency of the AFEC 322. The triphasic current shows an $I_{ac}$ 430, an $I_{bc}$ 432, and an $I_{ca}$ 434. The differences between each of the current phases is also depicted in FIG. 4D. The triphasic current experiences two frequencies—i.e. a periodic tendency exhibited by the signal envelope 428 with the period 426 and the faster frequency shown in more detail in FIG. 4D. Current ranges from approximately −220 Amperes (A) to 220 A.

FIG. 4C contains the graph 440, which shows AFEC 322 input voltage, which is approximately the output voltage of the power generation unit 320. FIG. 4C displays a subset of the data shown in the graph 400 of FIG. 4A on a shorter time scale. The graph 440 shows an example voltage (as measured at the line 302 of FIG. 3) as a function of time (on x-axis 442) and voltage (on y-axis 444). The time scale of graph 440 is approximately thirty-three times smaller than the time scale of graph 400, which displays the same voltage measured at line 302 of FIG. 3. The voltage displays periodicity on order of period 446, which is approximately $1.3*10^{-3}$ seconds (sec) in length. The triphasic voltage shows a $V_{ac}$ 450, a $V_{bc}$ 452, and a $V_{ca}$ 454. The triphasic voltage experiences two frequencies, where the longer frequency with the period 406 is visible in FIG. 4A and the shorter frequency with period 446 is shown in the graph 440. Voltage ranges from approximately −1000 V to 1000 V.

FIG. 4D contains the graph 460, which shows AFEC 322 input current, which is approximately the output current of the power generation unit 320. FIG. 4D displays a subset of the data shown in the graph 420 of FIG. 4B on a shorter time scale. The graph 460 shows an example current (as measured at the line 302 of FIG. 3) as a function of time (on x-axis 462) and current (on y-axis 464). The time scale of graph 460 is approximately thirty-three times smaller than the time scale of graph 420, which displays the same current measured at line 302 of FIG. 3. The voltage displays periodicity on order of period 466, which is approximately $1.3*10^{-3}$ seconds (sec) in length. The triphasic voltage shows an $I_{ac}$ 470, an $I_{bc}$ 472, and an $I_{ca}$ 474. The triphasic current can experience multiple frequencies, where a longer frequency with the period 426 is visible in FIG. 4B and a shorter frequency with period 466 related to the fundamental frequency of the alternator is shown in the graph 460. The triphasic current can be composed of additional frequency components, including harmonic frequency components. Voltage ranges from approximately −1000 V to 1000 V. Current ranges from approximately −110 A to 110 A.

Returning to circuit diagram 300 of FIG. 3, the AFEC 322 operates on the alternating voltage and current (as shown in FIGS. 4A-4D) output by the power generation unit 320 to generate a rectified output current and voltage measurable at the dashed line 304.

Figure 5A:
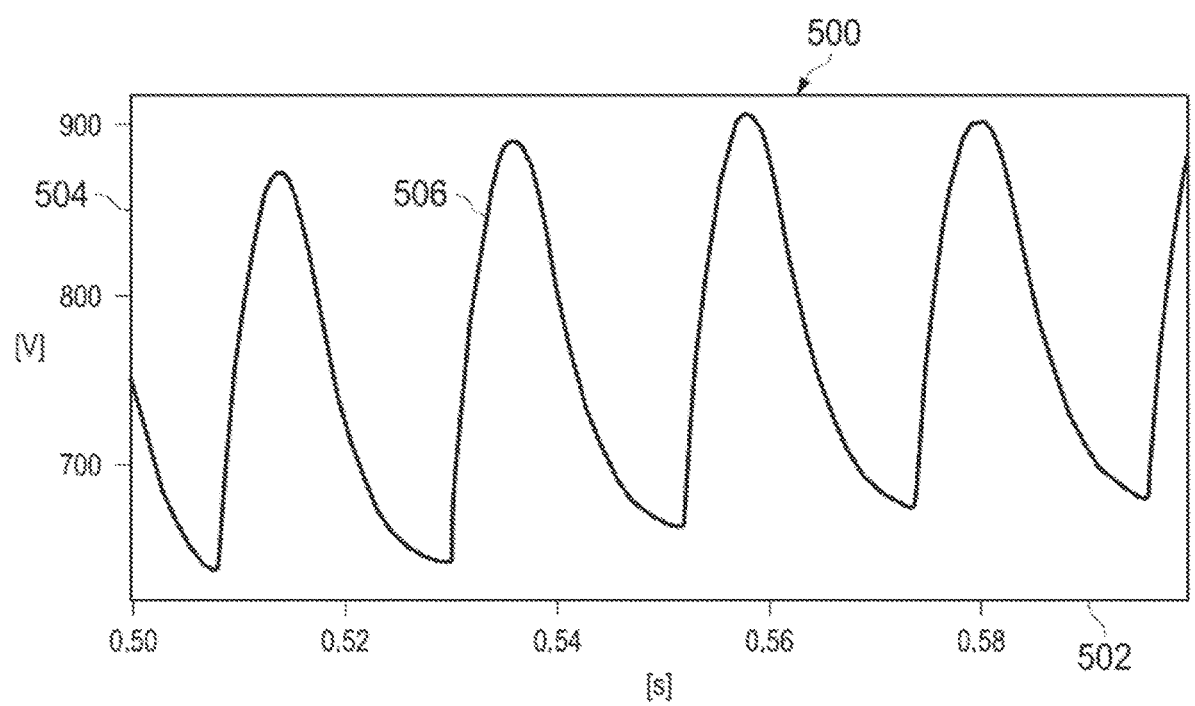
FIGS. 5A and 5B depict graphs of AFEC current and voltage output, according to various embodiments.
Figure 5B:
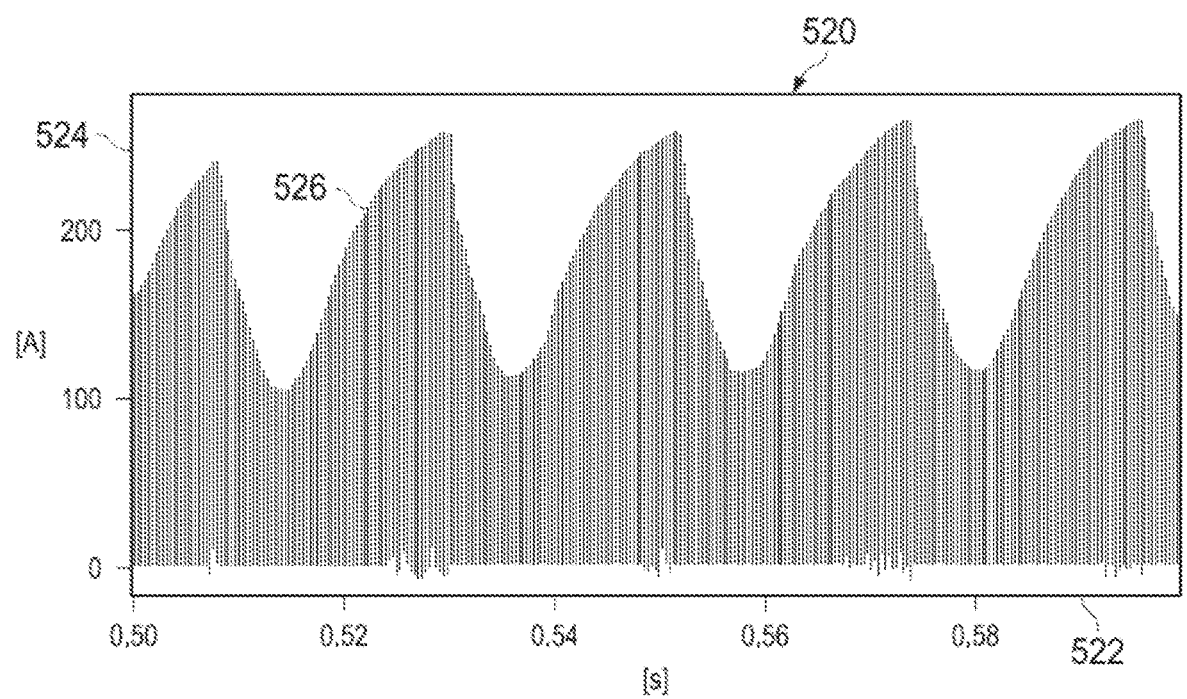

To illustrate, FIGS. 5A and 5B depict graphs of AFEC voltage and current output, according to various embodiments. FIGS. 5A-5B depict graphs 500 and 520. Operations of FIG. 5A-5B are described in reference to the example power conditioning system 200 of FIG. 2 and the circuit diagram 300 of FIG. 3.

FIG. 5A contains the graph 500, which shows AFEC 322 output voltage. The graph 500 shows a voltage signal 506 (as measured at the dashed line 304 of FIG. 3) as a function of time (on x-axis 502) and voltage (on y-axis 504). The voltage displays periodicity on the order of approximately 0.02 sec. Voltage ranges from approximately 600 to 950 V. The voltage signal 506 is a positive, DC signal that exhibits periodicity in amplitude at a substantially steady frequency.

FIG. 5B contains the graph 520, which shows AFEC 322 output current. The graph 520 shows a current signal 526 (as measured at the dashed line 304 of FIG. 3) as a function of time (on x-axis 522) and current (on y-axis 524). The current displays periodicity on the order of approximately 0.02 sec (as shown in the sawtooth nature of the wave envelope) and higher frequency periodicity as shown by the lines within the wave envelope. Current ranges from approximately 0 A to 250 A and is positive. Small negative current fluctuations occur at some instances when the current signal 526 reaches the 0 A value, but these fluctuations do not represent AC current.

Returning to circuit diagram 300 of FIG. 3, the DC link 324 is configured to receive the voltage and current output by the AFEC 322 (as shown in FIGS. 5A-5B) and measurable at the dashed line 304. The DC link 324 is configured to store excess electrical energy, remove resonant frequencies, and smooth current and voltage waveforms to provide a filtered electrical output to dynamic brake 326. In various embodiments, DC link 324 comprises four capacitors 360, 361, 362, and 363. The capacitors 360 and 361 are arranged in series with each other; and the capacitors 362 and 363 are arranged in series with each other. The set of the capacitors 360 and 361 is arranged in parallel with the set of the capacitors 362 and 363, with the two parallel series connected capacitors coupled by an inductor 356. The capacitors 360 and 361 can optionally be replaced by a single capacitor, as can the capacitors 362 and 363. The capacitors 360, 361, 362, and 363 can optionally be replaced by an alternate arrangement of capacitors or a bank of capacitors. The inductor 356 can be an air coil, a coil surrounding a non-dielectric material or a soft magnetic material, a length of wire formed around a coil or toroidal core, a length of wire formed around a metallic or semi-metallic core, etc. The DC link 324 can optionally include one or more resistor in parallel with each of the capacitors 360, 361, 362, and 363 in order to improve equitable voltage distribution between the sets of capacitors in series.

The inductor 356 can be positioned in the space between the center flow tube 262 and the outer skin 260 of the tool, as shown in FIG. 2. Alternatively, the inductor 356 of FIG. 3 may be positioned inside the outer skin 260 of the tool, where the center flow tube 262 passes through the inductor 356, such as through a center space of a toroidal inductor, or where the inductor 356 is formed around the center flow tube 262. The inductor 356 may be composed of stranded wire, such as Litz wire, rope-lay conductor, including wire coated with an insulating cover.

Together the capacitors 360, 361, 362, and 363 and the inductor 356 may be configured to block high frequency currents from passing from AFEC 322 to the other elements of the PCS 200. In various embodiments, AFEC 322 operates at a first switching frequency, such as 40 kHz, while the SAB 338 may operate at a second switching frequency, which can be 80 kHz, 100 kHz, or another value based on the characteristics of one or more FETs 376 of the SAB 338. In various embodiments, DC link 324 may provide an inductance in a range of 500 nanohenry (nH) to 1.3 microhenry (pH). In various embodiments, DC link 324 may be configured to carry currents as large as 200 Amperes (Amps). The input to the DC link 324 is approximately the output of the AFEC 322, measured at the dashed line 322. The output of the DC link 324 is measured at the dashed line 306.

To illustrate, FIGS. 6A, 6B, 6C, and 6D depict graphs of direct current (DC) link current and voltage input and output, according to various embodiments. FIGS. 6A-6D depict graphs 600, 620, 640, and 660. Operations of FIG. 6A-6D are described in reference to the example power conditioning system 200 of FIG. 2 and the circuit diagram 300 of FIG. 3.

Figure 6A:
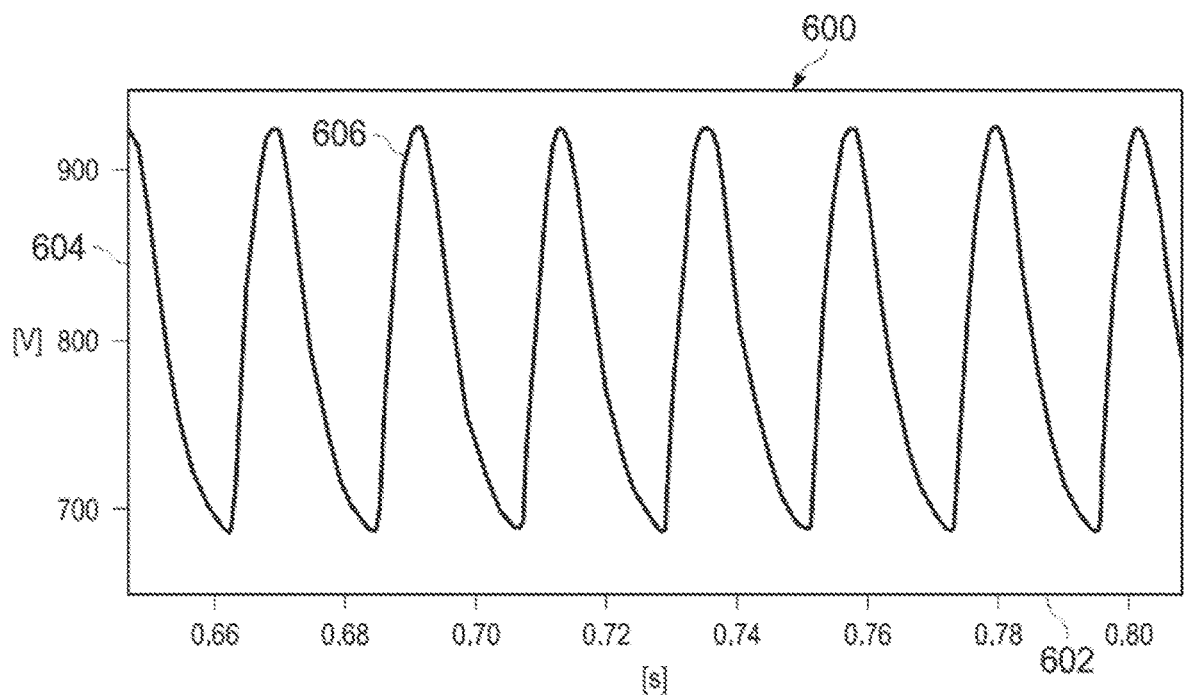
FIGS. 6A, 6B, 6C, and 6D depict graphs of direct current (DC) link current and voltage input and output, according to various embodiments.

FIG. 6A contains the graph 600, which shows DC link 324 input voltage. The graph 600 shows a voltage signal 606 (as measured at the dashed line 304 of FIG. 3) as a function of time (on x-axis 602) and voltage (on y-axis 604). The voltage displays periodicity on the order of approximately 0.02 sec. Voltage ranges from approximately 650 to 950 V. The voltage signal 606 is a positive, DC signal that exhibits periodicity in amplitude at a substantially steady frequency.

Figure 6B:
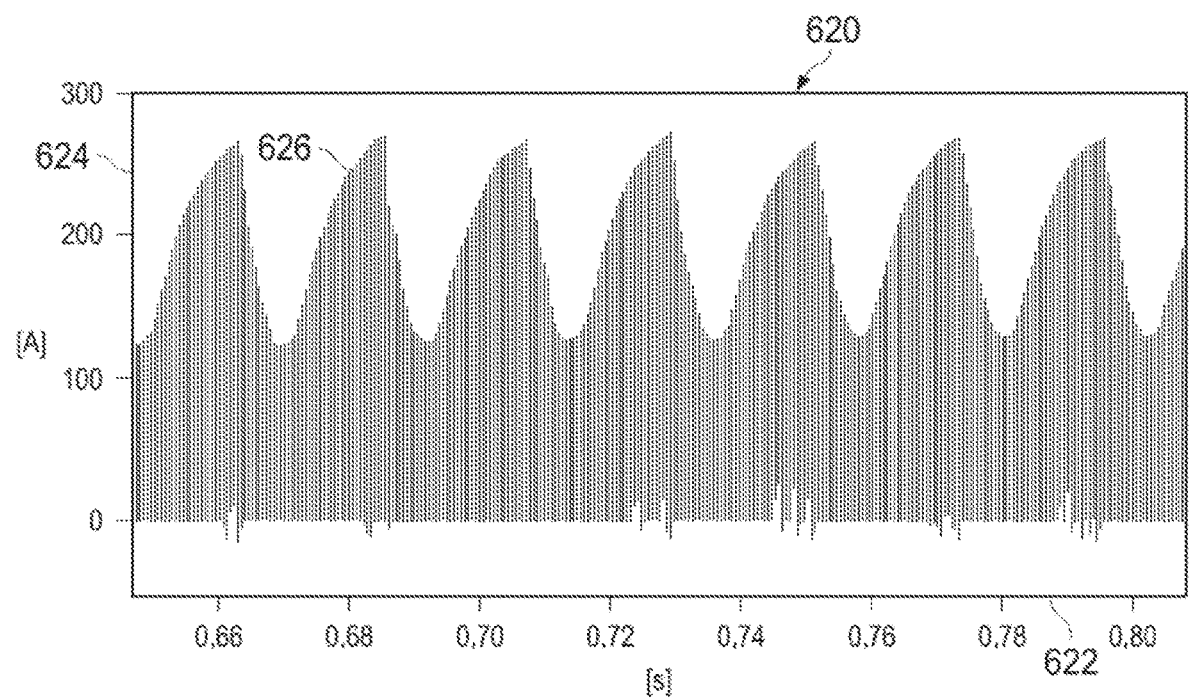

FIG. 6B contains the graph 620, which shows DC link 324 input current. The graph 620 shows a current signal 626 (as measured at the dashed line 304 of FIG. 3) as a function of time (on x-axis 622) and current (on y-axis 624). The current displays periodicity on the order of approximately 0.02 sec (as shown in the sawtooth nature of the wave envelope), at other harmonic frequencies, and at higher frequency periodicity as shown by the lines within the wave envelope. Current ranges from approximately 0 A to 250 A and is positive. Small negative current fluctuations may occur at some instances when the current signal 626 reaches the 0 A value, but these fluctuations do not represent AC current.

Figure 6C:
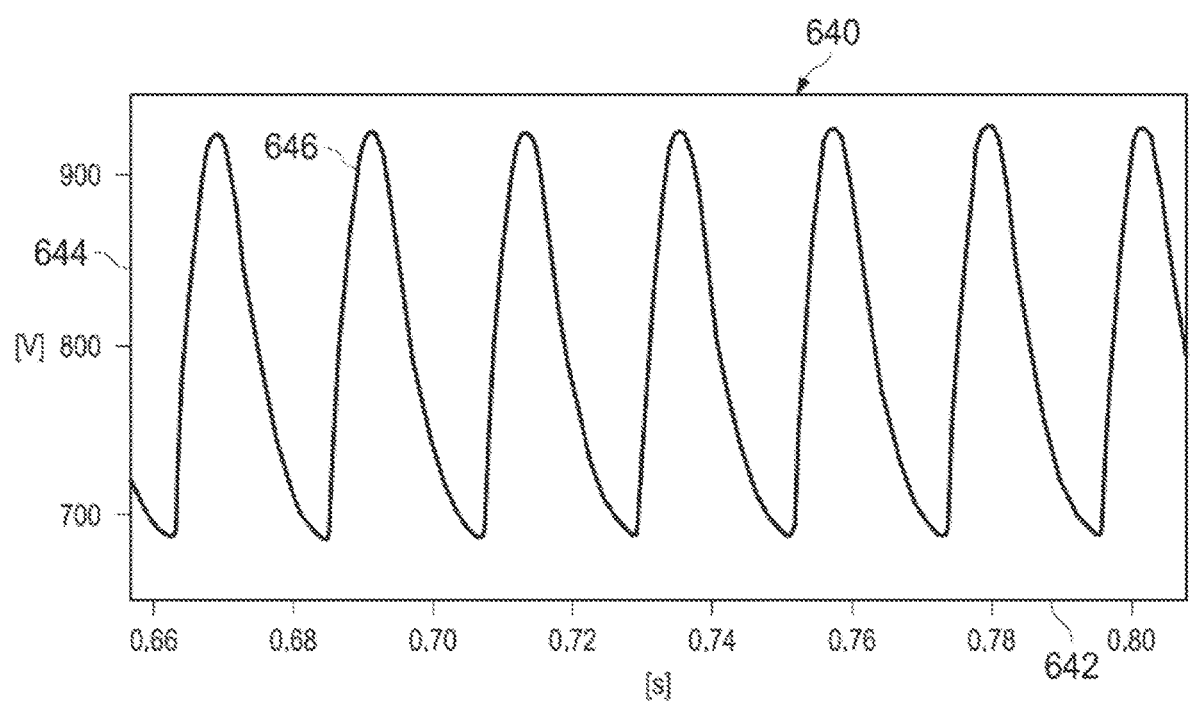

FIG. 6C contains the graph 640, which shows DC link 324 output voltage. The graph 640 shows a voltage signal 646 (as measured at the dashed line 306 of FIG. 3) as a function of time (on x-axis 642) and voltage (on y-axis 644). The voltage displays periodicity on the order of approximately 0.02 sec. Voltage ranges from approximately 650 to 950 V. The voltage signal 646 is a positive, DC signal that exhibits periodicity in amplitude at a substantially steady frequency.

Figure 6D:
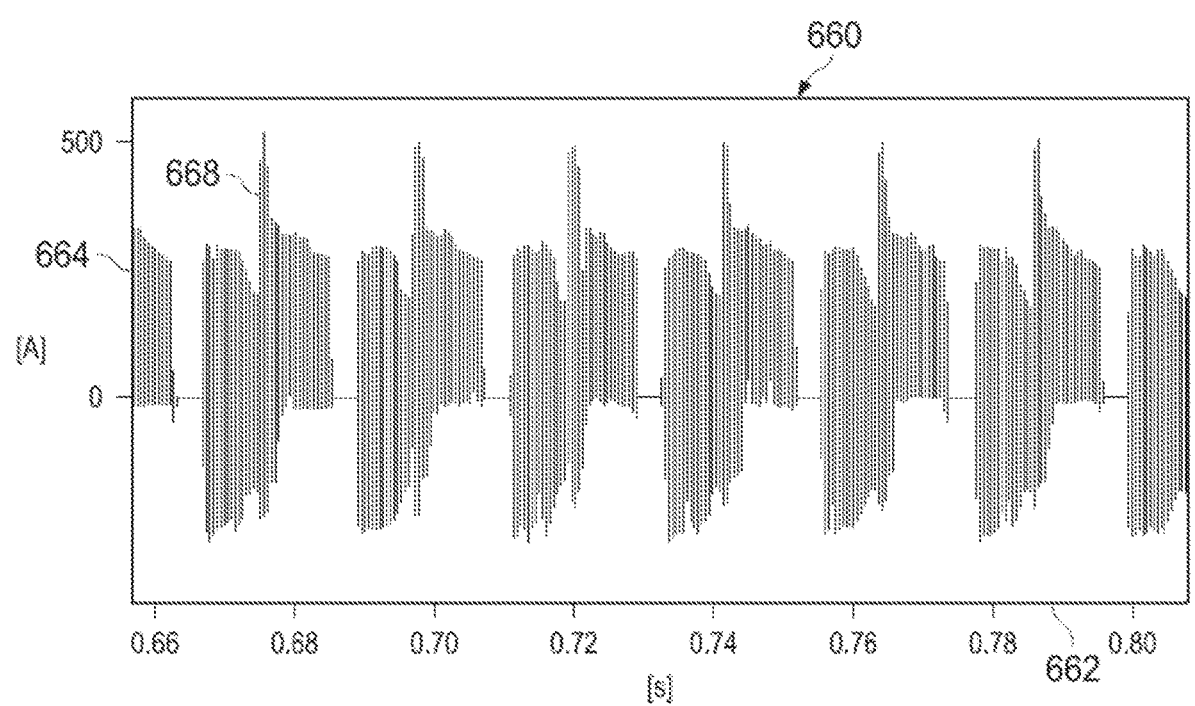

FIG. 6D contains the graph 660, which shows DC link 324 output current. The graph 660 shows a current signal 668 (as measured at the dashed line 306 of FIG. 3) as a function of time (on x-axis 662) and current (on y-axis 664). The current displays periodicity on the order of approximately 0.02 sec (and at other harmonic frequencies), which appears as a step function in the wave envelope and higher frequency periodicity as shown by the lines within the wave envelope. Current ranges from approximately −500 A to 500 A and is both positive and negative. The wave envelopes that appear on the order of every 0.02 sec are separated by sections where the current is zero, also occurring in periods of approximately 0.02 sec.

Returning to circuit diagram 300 of FIG. 3, in various embodiments dynamic brake 326 receives the alternating voltage and current (as shown in FIGS. 6A-6D) output by DC link 324, and is configured to protect the circuitry of the PCS of FIG. 2 from voltage and current overloads. In various embodiments, dynamic brake 326 comprises one or more FETs 370 and one or more resistor 372. The one or more FETs 370 and the one or more resistor 372 are configured to disperse as heat any extra electrical power caused by over voltage conditions by passing current through the one or more resistors 372 when the FET 370 is activated. The one or more FETs 370 comprise a switch configured to route current through the one or more resistors 372. The one or more FETs 370 may also comprise a high voltage detection circuit. The one or more resistor 372 may be a discrete resistor, resistors in series, or optionally one or more resistor connected to ground or the outer skin 260 of the tool such that high current can exit the PCS 200.

When the dynamic brake 326 is not active, the current and voltage output of the dynamic brake 326 measured at dashed line 308 is substantially the same as the current and voltage input of the dynamic brake 326, which is the current and voltage output of the DC link, as measured at the dashed line 306. When the dynamic brake 326 is active, current and voltage flowing to the SAB 338 are reduced, which can include an output of negligible current or an output of zero voltage. In some cases, when the dynamic brake 326 is active, the current and voltage flowing to the SAB 338 can be truncated or limited.

In various embodiments, together, the SAB 338, the booster transformer 328, and the diode bridge 348 make up the booster converter 208 of FIG. 2. In various embodiments, booster converter 208 is configured to function analogously to a solid-state transformer operating upon the quasi-DC voltage of the PCS 200. In various embodiments, SAB 338 operates on the output of the DC link 324 after it passes through the dynamic brake 326. The input to the SAB 338 is measured at dashed line 308, while the output of the SAB 338 is measured at the dashed line 310 (as will be shown in FIGS. 7A and 7B). In various embodiments, the SAB 338 contains multiple FETs 376. In various embodiments, the multiple FETs 376 are arranged in two parallel banks, each containing multiple FETs 376. In various embodiments, the SAB 338 may be composed of two identical modules in parallel. In various embodiments, the SAB 338, the booster transformer 328, and the diode bridge 348 all comprise parallel modules. Use of parallel modules and components may reduce the electrical power required to be carried across each of the individual modules, and therefore reduce the size requirements for the individual components of the booster converter 208. In one or more embodiments, the booster converter 208 fits between the center flow tube 262 and the outer skin 260 of the tool body and as such smaller components are desirable.

The SAB 338 switching speed may be determined by the individual components, such as the multiple FETs 376, and any control circuitry. The SAB 338 produces the high frequency component of the output voltage and current for which the booster converter 208 is configured, where the pulse power drilling electrodes operate on current delivered by the PCS 200 but not necessarily at the high frequency of the SAB 338. In some embodiments, the SAB 338 is configured to operate at a frequency of approximately 80 kHz. In some embodiments, the SAB 338 is configured to operate at a frequency of approximately 100 kHz. The operating frequency of the SAB 338 may be adjusted by adjusting its at least one of software control adjustment and/or replacing individual components, where the SAB 338 may have an adjustable frequency range. The SAB 338 generates two high-frequency square wave quasi-DC signals on which the booster transformer 328 is configured to operate. In general, transformers change voltage levels for AC signals and not DC signals, but can operate on the quasi-DC square waves that the SAB 338 outputs because the square wave (or other near vertical impulses is current or voltage) have non-zero derivatives of magnetic flux and therefore obey Faraday's law.

Figure 7A:
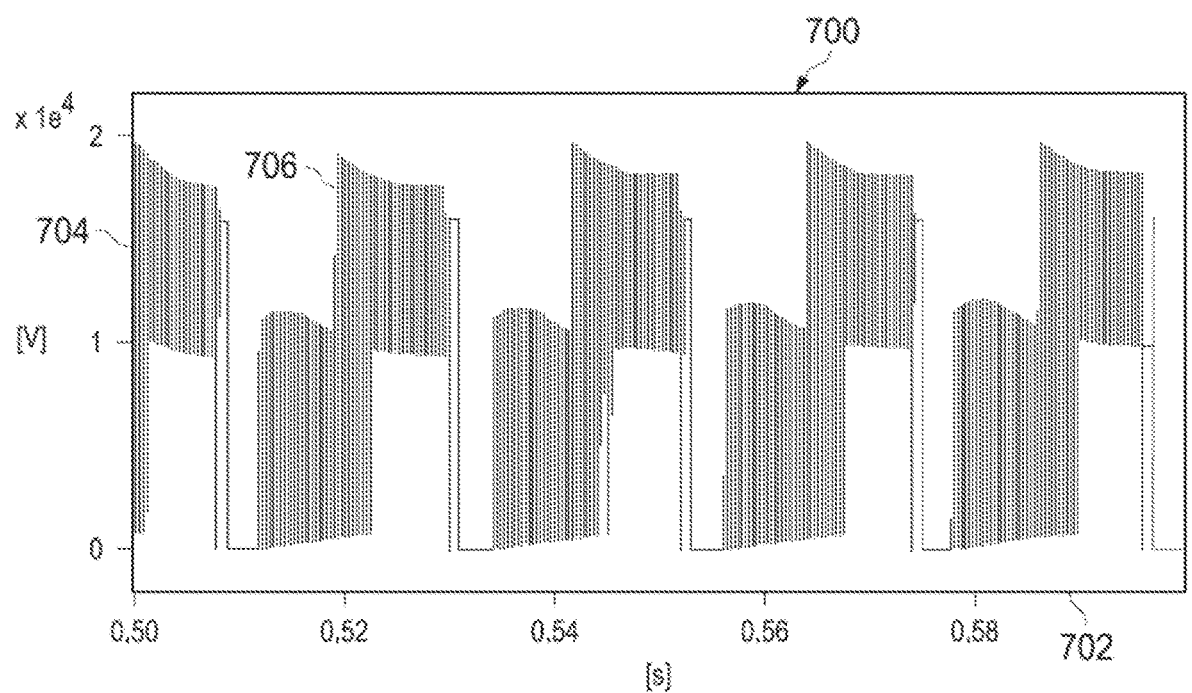
FIGS. 7A and 7B depict graphs of single active bridge (SAB) output current and voltage according to various embodiments.
Figure 7B:
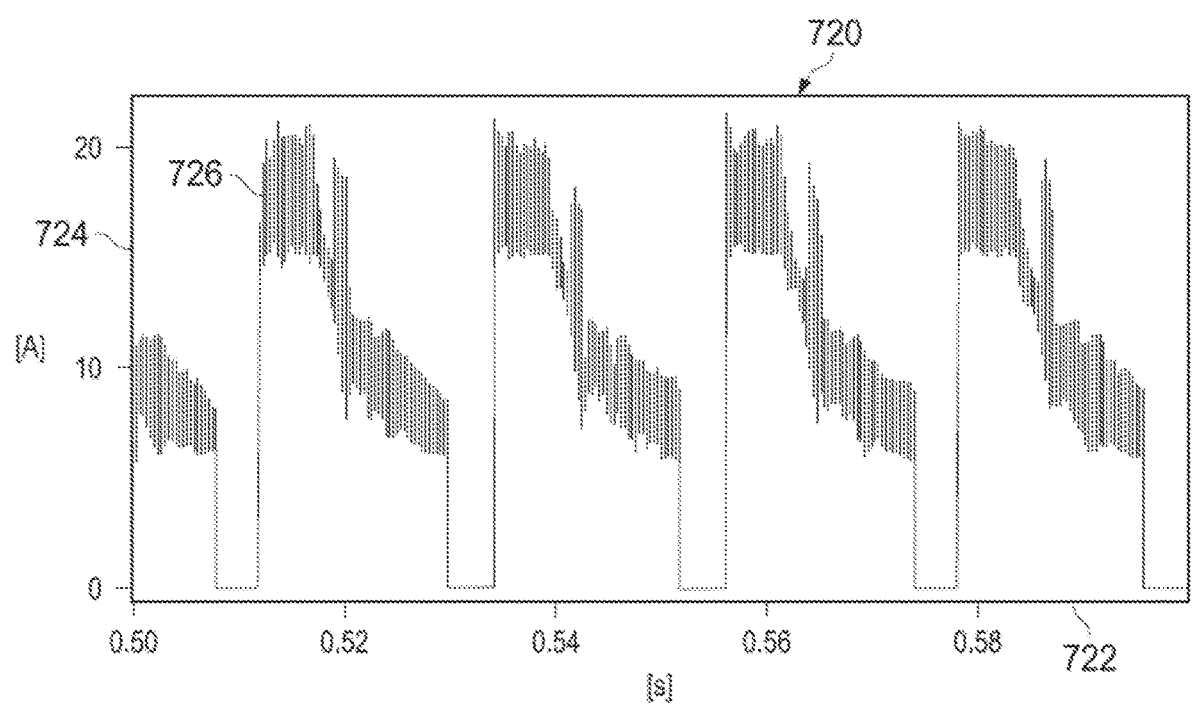

To illustrate FIGS. 7A and 7B depict graphs of single active bridge (SAB) output voltage and current, according to various embodiments. FIGS. 7A-7B depict graphs 700 and 720. Operations of FIG. 7A-7B are described in reference to the example power conditioning system 200 of FIG. 2 and the circuit diagram 300 of FIG. 3. The SAB 338 as shown in FIGS. 2 and 3 has two output voltages and currents for the parallel sections of the booster transformer 328. For simplicity, one set of output voltage and current is shown.

FIG. 7A contains the graph 700, which shows the SAB 338 output voltage. The graph 700 shows a voltage signal 706 (as measured at the dashed line 310 of FIG. 3) as a function of time (on x-axis 702) and voltage (on y-axis 704). The wave envelope of the voltage displays periodicity on the order of approximately 0.02 sec, and secondarily a high frequency within the wave envelope indicated by multiple, thin lines. The voltage signal also exhibits periods with approximately zero voltage, on the order of the wave envelope periodicity. Voltage ranges from approximately 0 to 20 kV. The voltage signal 706 is a positive, DC signal with three distinct behaviors over time. A period of zero voltage is followed by a period where voltage ranges from 0 to approximately 10 kV, followed by a second higher voltage period where voltage ranges from approximately 10 kV to 20 kV. There is some overlap between the first and second high voltage periods.

FIG. 7B contains the graph 720, which shows the SAB 338 output current. The graph 720 shows a current signal 726 (as measured at the dashed line 310 of FIG. 3) as a function of time (on x-axis 722) and current (on y-axis 724). The wave envelope of the current displays periodicity on the order of approximately 0.02 sec, while the current signal 726 displays additional, higher frequency periodicity as shown by the lines within the wave envelope. The current signal 726 exhibits periods of negligible current, which roughly coincide with the periods of zero voltage for the voltage signal 706. Current ranges from approximately 0 A to 20 A and is positive with two distinct behaviors over time. A period of zero current is followed by a period where current ranges from 20 A to approximately 10 A. The current signal decreases over the high current period and displays high frequency variations on the order of approximately 4 A.

Returning to circuit diagram 300 of FIG. 3, in various embodiments booster transformer 328 is configured to receive the alternating voltage and current output by the SAB 338 (as shown in FIGS. 7A and 7B), and to generate an output currents and voltages measurable at the dashed line 312, as will be shown in FIGS. 8A-8D. In various embodiments, booster transformer 328 comprises transformers 380. In one or more embodiments, the booster transformer 328 contains two transformers 380. The transformers 380 may be high-voltage high-frequency (HVHF) transformers. In various embodiments, transformers 380 occupy the space between the center flow tube 262 and the outer skin 260 of the tool body, as shown in FIG. 2. In various embodiments, the center flow tube 262 has a reduced cross-sectional dimension through the booster transformer 328 and a larger cross-sectional dimension in one or more other portions of PCS 200. In various embodiments, the transformers 380 are toroidal in shape. A toroidal shape may reduce the amount of magnetic flux outside of the core of the transformers 380 when compared (for example) to squared transformers. In various embodiments, the transformers 380 have a magnetic core. In various embodiments, the transformers 380 have multiple magnetic cores, as will the output inductor 386 (as will be discussed in relationship with FIGS. 11A-11B). In various embodiments, the transformers 380 have multiple magnetic cores with high magnetic permeability, while those of the output inductor 386 have low or lower magnetic permeability.

In various embodiments of transformers 380, the use of parallel circuitry reduces the electrical power flowing through each of the circuits, and thereby lowers size requirements on each of the individual transformers 380 and other individual components. Because the form factor for the PCS 200 is restricted, smaller components are preferable. Further, the use of parallel circuitry also reduces the ripple current of each of the transformers 380. Because ripple current is undesirable in DC applications, such as for charging pulse power electrodes, parallel transformers satisfy two or more design considerations. In various embodiments, each of the transformers 380 has non-negligible current leakage and stray magnetizing inductance. These non-idealities can affect the performance of the FETs 376 of the SAB 338.

In various embodiments, the booster converter 328 is configured to convert 800 V (AC) input into an approximately 18 kV (AC) output. The AC output of the booster converter 328 is then rectified by the diode bridge 348 into an 18 kV (DC) output. In various embodiments, booster transformer 328 is configured to provide the step up in voltage. The booster transformer 328 has both a primary voltage and current and a secondary voltage and current. In various embodiments, the transformer voltage ratio is approximately 1:14.

To illustrate, FIGS. 8A, 8B, 8C and 8D depict graphs of booster transformer currents and voltages, according to various embodiments. FIGS. 8A-8D depict graphs 800, 820, 840, and 860. Operations of FIG. 8A-8D are described in reference to the example power conditioning system 200 of FIG. 2 and the circuit diagram 300 of FIG. 3. The booster transformer 328 relates two sets of current and voltage, the primary voltage and current depicted in FIGS. 8A and 8B and the secondary voltage and current depicted in FIGS. 8C and 8D.

Figure 8A:
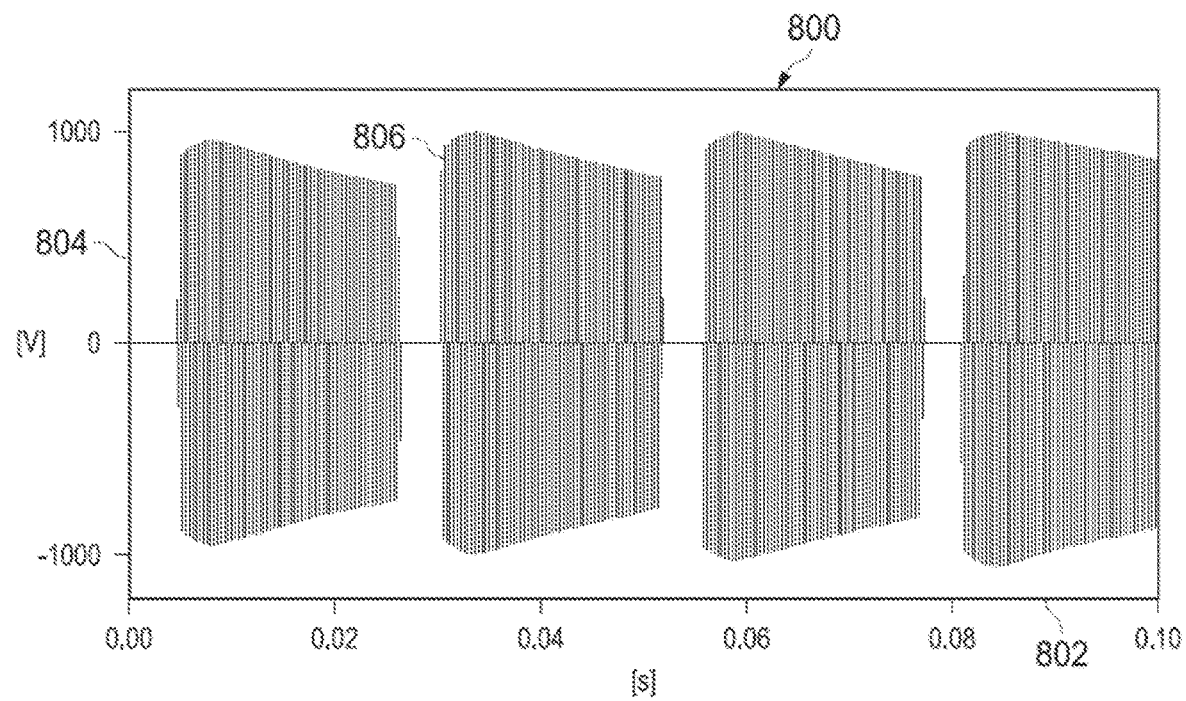
FIGS. 8A, 8B, 8C and 8D depict graphs of booster transformer output currents and voltages, according to various embodiments.

FIG. 8A contains the graph 800, which shows the booster transformer 328 primary voltage. The graph 800 shows a voltage signal 806 (as measured at the dashed line 312 of FIG. 3) as a function of time (on x-axis 802) and voltage (on y-axis 804). The wave envelope of the voltage displays periodicity on the order of approximately 0.02 sec, and secondarily a high frequency within the wave envelope indicated by multiple, thin lines. The voltage signal exhibits periods with approximately zero voltage, on the order of the wave envelope periodicity. Voltage ranges from approximately −1 to 1 kV. The voltage signal 806 is a square wave signal, which is neither strictly AC nor DC. A period of zero voltage separates the wave envelope into sections of high-frequency voltage, where the peak voltage magnitude decreases from 1000 V to approximately 800 V over about 0.017 sec.

Figure 8B:
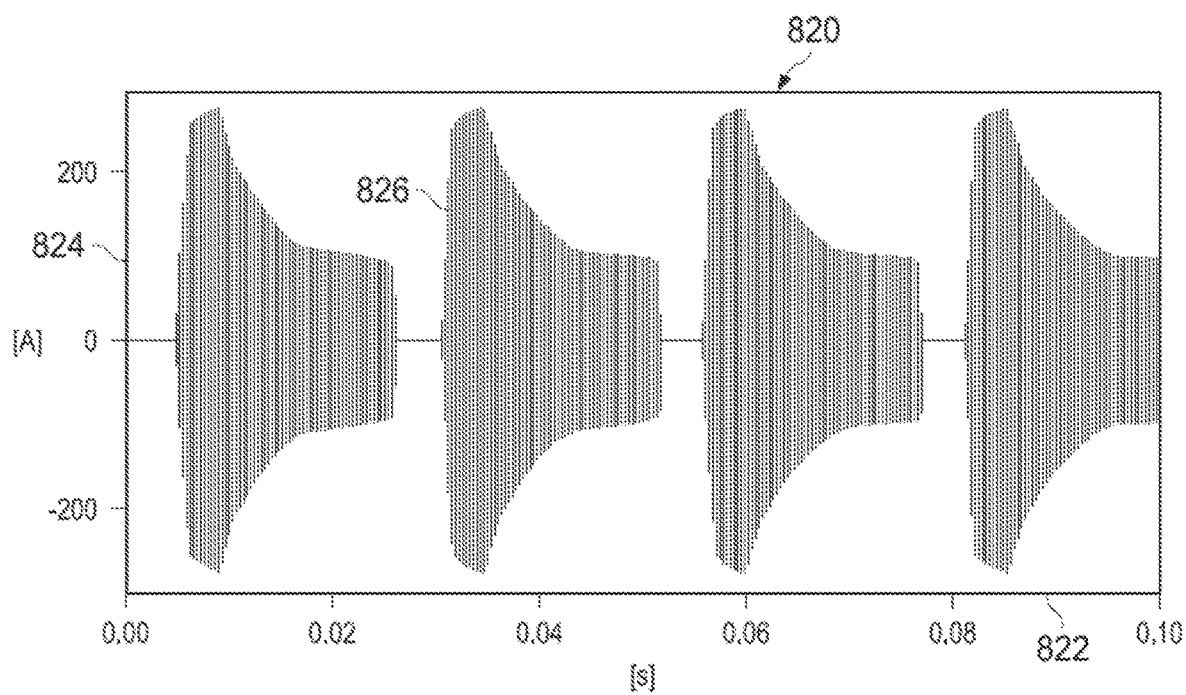

FIG. 8B contains the graph 820, which shows the booster converter 328 primary current. The graph 820 shows a current signal 826 (as measured at the dashed line 312 of FIG. 3) as a function of time (on x-axis 822) and current (on y-axis 824). The wave envelope of the current displays periodicity on the order of approximately 0.02 sec, while the current signal 826 displays additional, higher frequency periodicity as shown by the lines within the wave envelope. The current signal 826 exhibits periods of negligible current, which roughly coincide with the periods of zero voltage for the voltage signal 806. Current ranges from approximately −200 A to 200 A. The current signal 826 is a square wave signal, which is neither strictly AC nor DC. A period of zero current separates the wave envelope into sections of high-frequency current, where the peak current magnitude decreases from approximately 250 A to 150 A over about 0.017 sec.

Figure 8C:
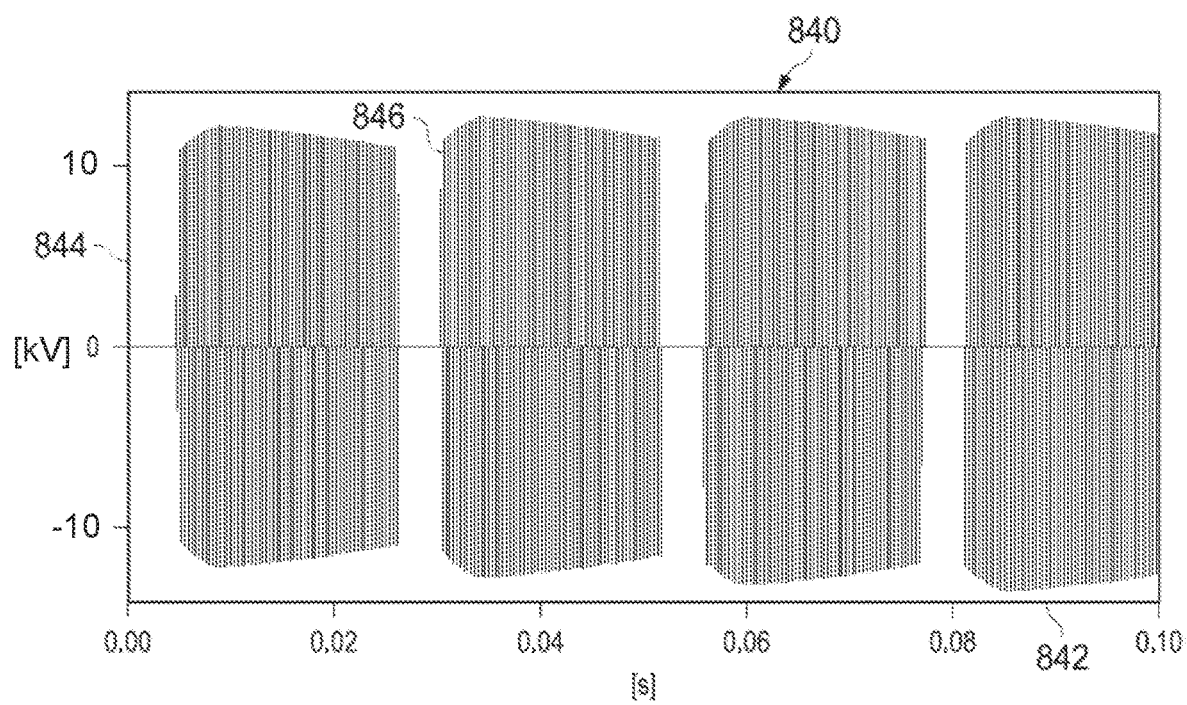

FIG. 8C contains the graph 840, which shows the booster transformer 328 secondary voltage. The graph 840 shows a voltage signal 846 (as measured at the dashed line 312 of FIG. 3) as a function of time (on x-axis 842) and voltage (on y-axis 844). The wave envelope of the voltage displays periodicity on the order of approximately 0.02 sec, and secondarily a high frequency within the wave envelope indicated by multiple, thin lines. The voltage signal exhibits periods with approximately zero voltage, on the order of the wave envelope periodicity. Voltage ranges from approximately −12 to 12 kV. The voltage signal 846 is a square wave signal, which is neither strictly AC nor DC. A period of zero voltage separates the wave envelope into sections of high-frequency voltage, where the peak voltage magnitude decreases from approximately 12 kV to approximately 10 V over about 0.017 sec.

Figure 8D:
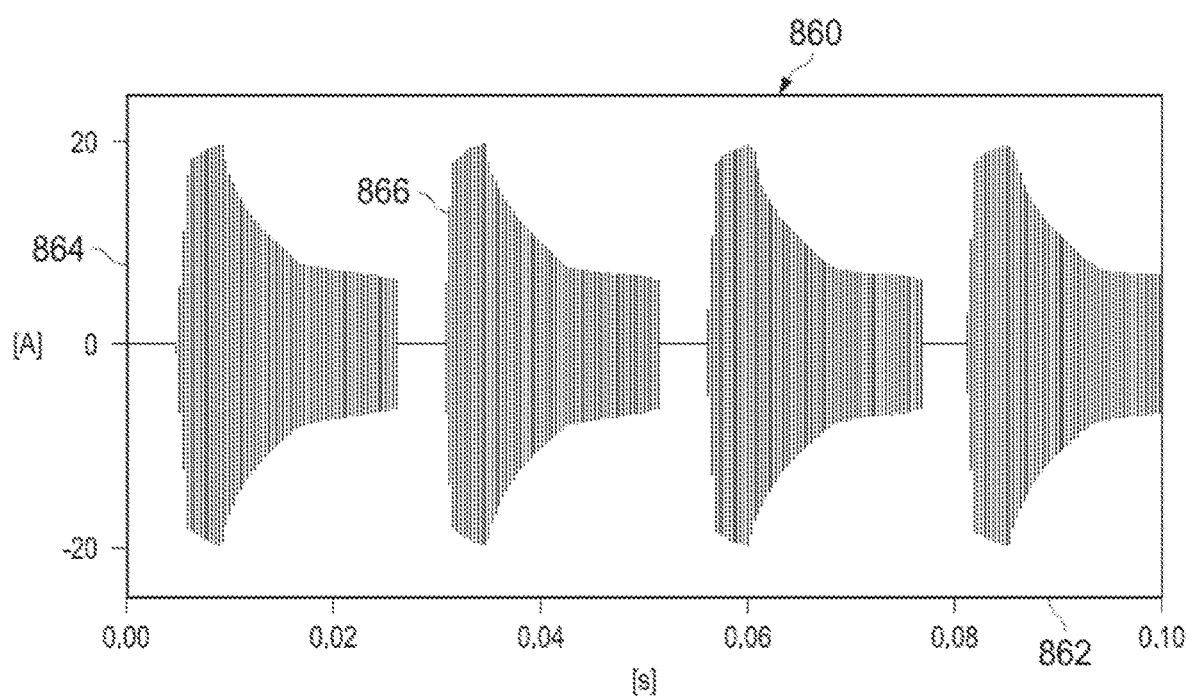

FIG. 8D contains the graph 860, which shows the booster converter 328 secondary current. The graph 860 shows a current signal 866 (as measured at the dashed line 312 of FIG. 3) as a function of time (on x-axis 862) and current (on y-axis 864). The wave envelope of the current displays periodicity on the order of approximately 0.02 sec, while the current signal 866 displays additional, higher frequency periodicity as shown by the lines within the wave envelope. The current signal 866 exhibits periods of negligible current, which roughly coincide with the periods of zero voltage for the voltage signal 846. Current ranges from approximately −20 A to 20 A. The current signal 866 is a square wave signal, which is neither strictly AC nor DC. A period of zero current separates the wave envelope into sections of high-frequency current, where the peak current magnitude decreases from approximately 20 A to 8 A over about 0.017 sec.

Figure 9A:
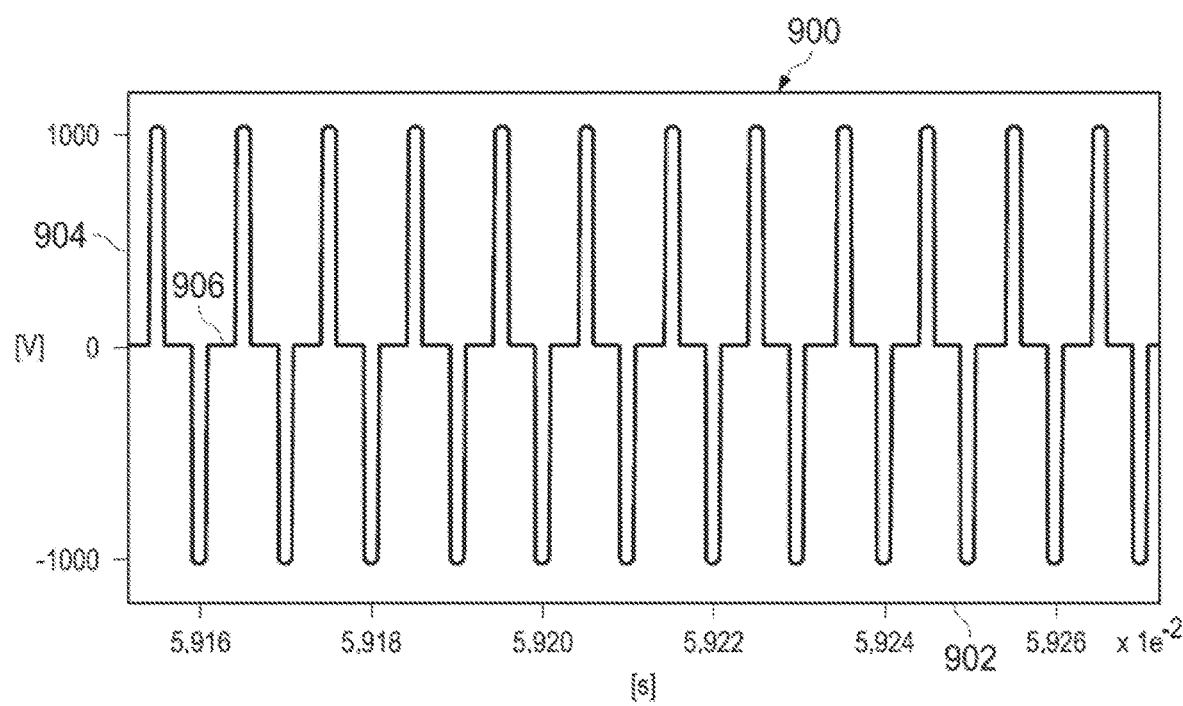
FIGS. 9A and 9B depict graphs of booster transformer voltages at a time scale on the order of the switching frequency.
Figure 9B:
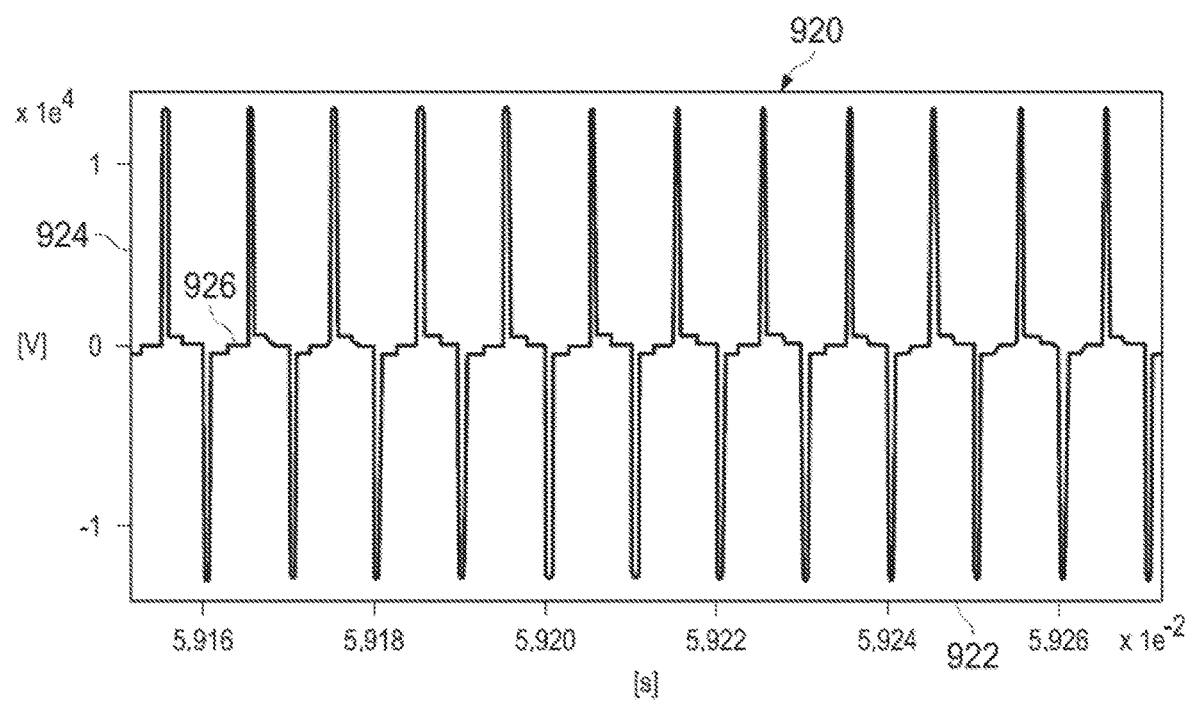

FIGS. 9A and 9B depict graphs of booster transformer voltages at a time scale on the order of the switching frequency, according to various embodiments. FIGS. 9A-9B depict graphs 900 and 920. Operations of FIG. 9A-9B are described in reference to the example power conditioning system 200 of FIG. 2, and the circuit diagram 300 of FIG. 3.

FIG. 9A contains the graph 900, which shows the booster transformer 328 primary voltage (as previously depicted in FIG. 8A) on a 0.1 ms time scale. The graph 900 shows a voltage signal 906 (as measured at the dashed line 314 of FIG. 3) as a function of time (on x-axis 902) and voltage (on y-axis 904). The voltage displays periodicity on the order of approximately 0.01 ms. The voltage signal exhibits periods with approximately zero voltage, at on the order of twice the wave envelope periodicity. Voltage ranges from approximately −1 to 1 kV. The voltage signal 906 is a square wave signal. The periodicity of the voltage signal is produced by the switching frequency of the SAB 338.

FIG. 9B contains the graph 920, which shows the booster converter 328 secondary voltage (as previously depicted in FIG. 8C) on a 0.1 ms time scale. The graph 920 shows a voltage signal 926 (as measured at the dashed line 314 of FIG. 3) as a function of time (on x-axis 922) and voltage (on y-axis 924). The voltage displays periodicity on the order of approximately 0.001 sec. The voltage signal exhibits periods with approximately zero voltage, at on the order of twice the wave envelope periodicity. Voltage ranges from approximately −10 to 10 kV. The voltage signal 926 is a square wave signal. The periodicity of the voltage signal is transmitted to the secondary voltage from the periodic primary voltage (as shown in FIG. 9A).

Voltage and current flow from the booster converter 328 to the diode bridge 348, where the current is rectified to produce DC electrical source to the pulse power electrodes. The booster converter, together with the SAB 338 and the diode bridge 348, may be configured to generate the high-voltage DC current that is output from circuitry 300 and may be used to power additional modules of the pulse power drilling assembly, including the one of more electrode(s).

Returning to circuit diagram 300 of FIG. 3, the diode bridge 348 is configured to receive the alternating voltage and current output by the booster transformers 328 (as shown in FIGS. 8A-8C), and to generate an output current and voltage measurable at the dashed line 314. The output current of the diode bridge is approximately equal to the output current of the SAB 338 as shown in FIG. 7B. The output current of the diode bridge is the rectified output current of the booster transformer 328, and as such experiences more ripple current that the SAB 338 output current. The output current of the diode bridge 348 is the input current of the output inductor 386, which will be discussed in reference to FIG. 10A. The diode bridge 348 converts the quasi-AC current from the booster converter 328 into a DC signal with positive current and voltage. In various embodiments, the diode bridge 348 contains one or more diodes 384. Each output of the transformers 380 of the booster converter 328 may be associated with one or more diode 384. In various embodiments, the diodes 384 are non-switching elements which rectify current and voltage inputs.

In one or more embodiments, the diodes 384 can be controllable, switchable, or adjustable.

The diode bridge 348 contains diodes 384 that function as junctions permitting DC current to flow through. In various embodiments, the current from the two parallel sections of the SAB 338, the booster converter 328, and the diode bridge 348 is rejoined after the rectification before flowing to the output inductor and switch 330.

In various embodiments, the diode bridge 348 comprises two full bridge rectifiers in parallel, each rated at 50 kW. in various embodiments, the diode bridge 348 is configured to output current and voltage to the output inductor and switch 330, as measured at the dashed line 314.

Returning to circuit diagram 300 of FIG. 3, the output inductor and switch 330 may be configured to receive the direct voltage and current output provided by the diode bridge 348, and to generate an output current and voltage provided as a final output from circuitry 300 to the one or more additional modules of the pulsed power drilling assembly to the pulse power electrodes. In various embodiments, the output inductor and switch 330 contains an inductor 386 and one switch 392. In various embodiments, the output inductor and switch 330 optionally includes one or more capacitor 388 and one or more resistor 390.

In various embodiments, the output inductor 386 comprises a single output inductor. In various embodiments, the output inductor and switch 330 contain more than one inductor, including a primary inductor and a secondary inductor in series or in parallel with the primary inductor. In various embodiments, the output inductor 386 is configured to limit the ripple current, or ripple, present in the current output to the pulse power electrodes. In various embodiments, the output inductor 386 occupies the space between the center flow tube 262 and the outer skin 260 of the tool body. In various embodiments, the output inductor 386 comprises a coil in series between the output of the booster converter 228 and the output of the PCS 200 to the pulse power electrodes. In various embodiments, output inductor 386 is configured to provide a final filtering of the current and voltage at high voltage range of voltage(s) present after the booster transformer 328 and associated switching and filtering circuitry, such as the SAB 338 and the diode bridge 348. In various embodiments, the core of the inductive coil is a low permeability material such as powder powered ferrite. In various embodiments, the output inductor comprises an inductor where the center flow tube 262 passes through the center cavity of a toroidal inductor. The coil of the output inductor 386 may comprise electrical cable, such as Litz wire, and may be coated with insulator. The output inductor 386 will be discussed further in reference to FIGS. 11A and 11B.

Figure 10A:
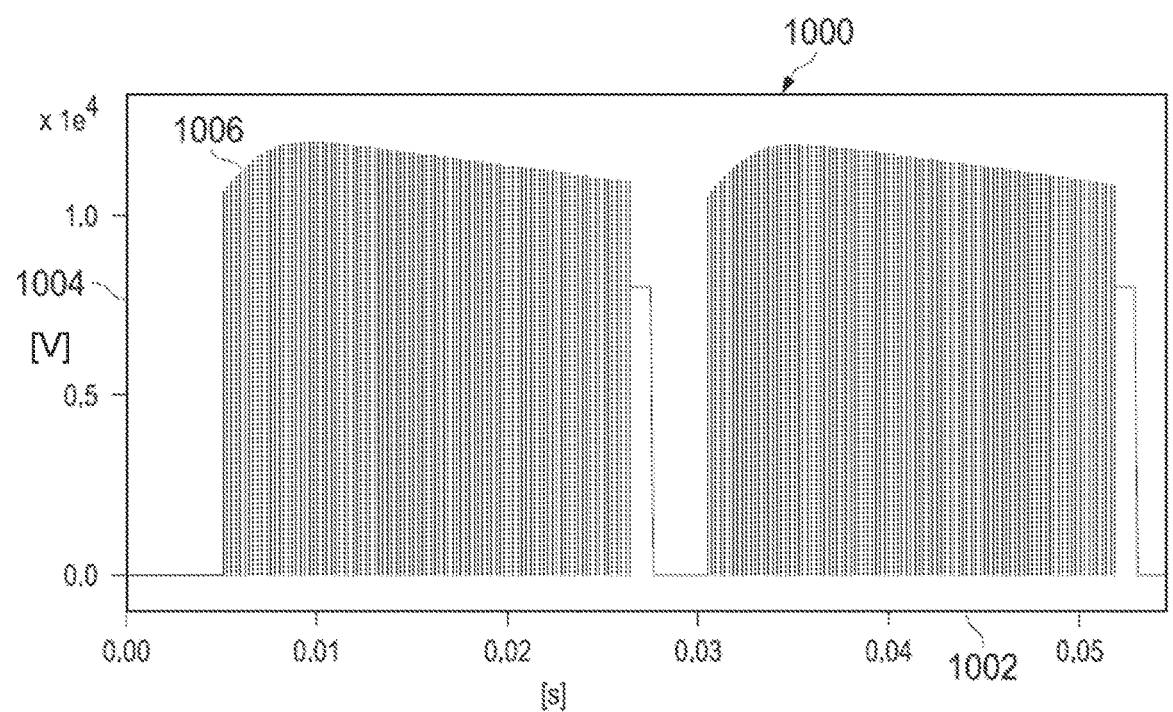
FIGS. 10A, 10B, 10C, and 10D depict graphs of output inductor input current, output current and voltage, and output power, according to various embodiments.
Figure 10B:
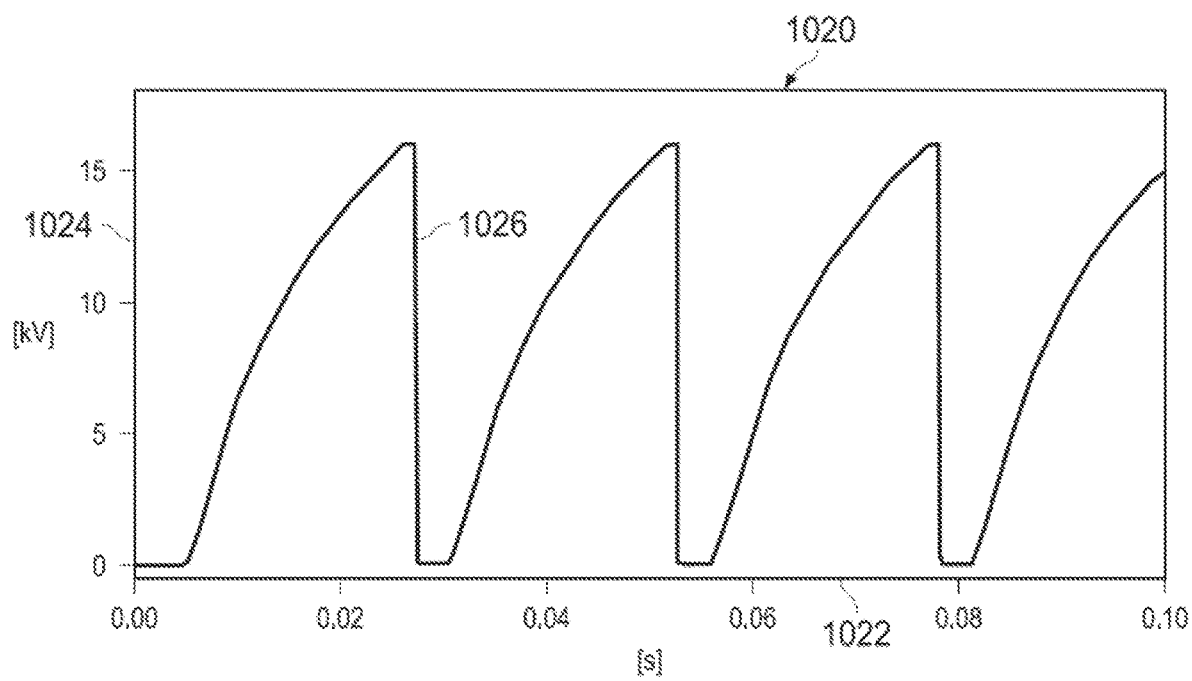
Figure 10C:
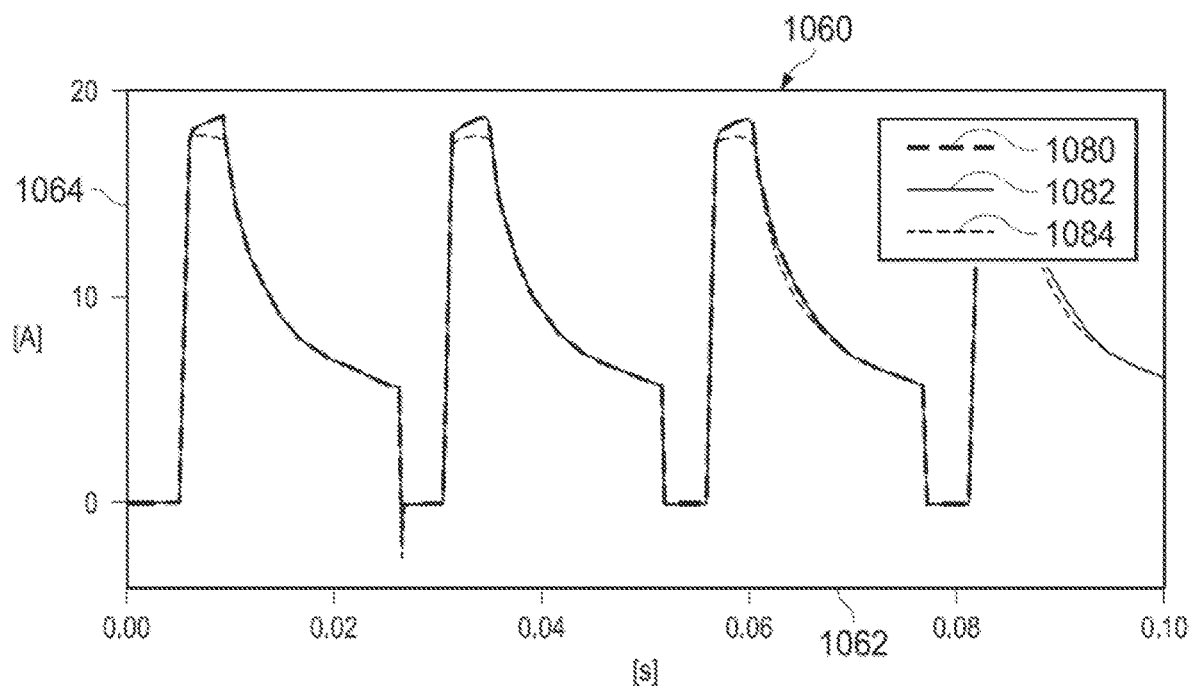

To illustrate, FIGS. 10A, 10B, 10C, and 10D depict graphs of output inductor input current, output current and voltage, and output power, according to various embodiments. FIGS. 10A-10C depict graphs 1000, 1020, 1060, and 1090. Operations of FIG. 10A-10C are described in reference to the example power conditioning system 200 of FIG. 2, and the circuit diagram 300 of FIG. 3.

FIG. 10A contains the graph 100, which shows half the output inductor 386 input voltage. The graph 1000 shows a voltage signal 1006 (as measured at the dashed line 314 of FIG. 3) as a function of time (on x-axis 1002) and voltage (on y-axis 1004). The input to the output inductor 386 is approximately the output of the diode bridge 348. The wave envelope of the voltage displays periodicity on the order of approximately 0.02 sec, and secondarily a high frequency within the wave envelope indicated by multiple, thin lines. The voltage signal exhibits periods with approximately zero voltage, on the order of the wave envelope periodicity. Voltage ranges from approximately 0 to 12 kV. The voltage signal 1006 is a square wave signal. A period of zero voltage separates the wave envelope into sections of high-frequency voltage, where the peak voltage magnitude decreases from 12 kV to approximately 10 kV over about 0.017 sec.

FIG. 10B contains the graph 1020, which shows the output inductor 386 output voltage. The graph 1000 shows a voltage signal 1026 (as measured at the dashed line 316 of FIG. 3) as a function of time (on x-axis 1022) and voltage (on y-axis 1024). The voltage displays periodicity on the order of approximately 0.02 sec. The voltage signal exhibits periods with approximately zero voltage, on the order of the wave envelope periodicity. Voltage ranges from approximately 0 to 16 kV, where the voltage signal 1026 increases supra-linearly from 0 kV to 16 kV, remaining at 16 kV for approximately 1 ms, before returning sharply to 0 kV. The drop in the voltage signal 1026 from 16 kV to 0 kV is sharp, happening approximately instantaneously when compared to the 0.02 sec voltage period. The voltage drop occurs when one or more capacitive elements of the pulse power electrodes are discharged.

FIG. 10C contains the graph 1060, which shows the output inductor 386 output current. The graph 1060 shows three current signals—a switch current 1080, an average current 1082, and a reference current 1084 (as measured at the dashed line 316 of FIG. 3) as a function of time (on x-axis 1062) and current (on y-axis 1064). The wave envelope of the current signals displays periodicity on the order of approximately 0.02 sec. The current signals 1080, 1082, and 1084 exhibits periods of negligible current, which roughly coincide with the periods of zero voltage for the voltage signal 1026. Current ranges from approximately 0 A to 22 A. The switch current 1080, the average current 1082, and the reference current 1084 exhibit similar patterns and periodicity, with the average current 1082 and the reference current 1084 substantially identical. The switched current 1080 differs from the average current 1082 and the reference current 1084 during the period of highest current, where the switched current 1080 exhibits a flat current after reaching a maximum current before decreasing whereas the average current 1082 and the reference current 1086 exhibit a slight increase in current after the maximum current is reached.

In various embodiments, the voltage and current outputs of the inductor 386 comprise a constant current-constant power (CC-CP) output. The cycle begins (after a period of approximately zero current and zero voltage) with a current ramp from 0 A to 18 A in 1 millisecond (ms). The current is constant at the highest current (or optionally experiences a slight increase) for approximately 3 ms. Once the current is high, the voltage ramps up from 0 V to 22 kV, which increases the power output from zero (i.e. 0 W) to the maximum power output. In the example described above, the maximum possible power output would be maximum current multiplied by the maximum voltage, or 22 kV times 18 A for 396 kW or approximately 400 kW. However, in various embodiments, the maximum power output is lower than the maximum possible power output—i.e. the maximum power output can be 100 kW or another value based on the configuration of the PCS 200 and the pulse power electrodes. Once the maximum power output is reached, the current and voltage adjust simultaneously to keep the power output constant as the voltage continues to increase to the maximum voltage. In some embodiments, this means that the current decreases inversely with the voltage after the maximum power output is attained. In one or more embodiment, the maximum power output is maintained until the pulse power electrodes are discharged or otherwise separated from electrical connection with the PCS 200, such as through the operation of the switch 392.

Figure 10D:
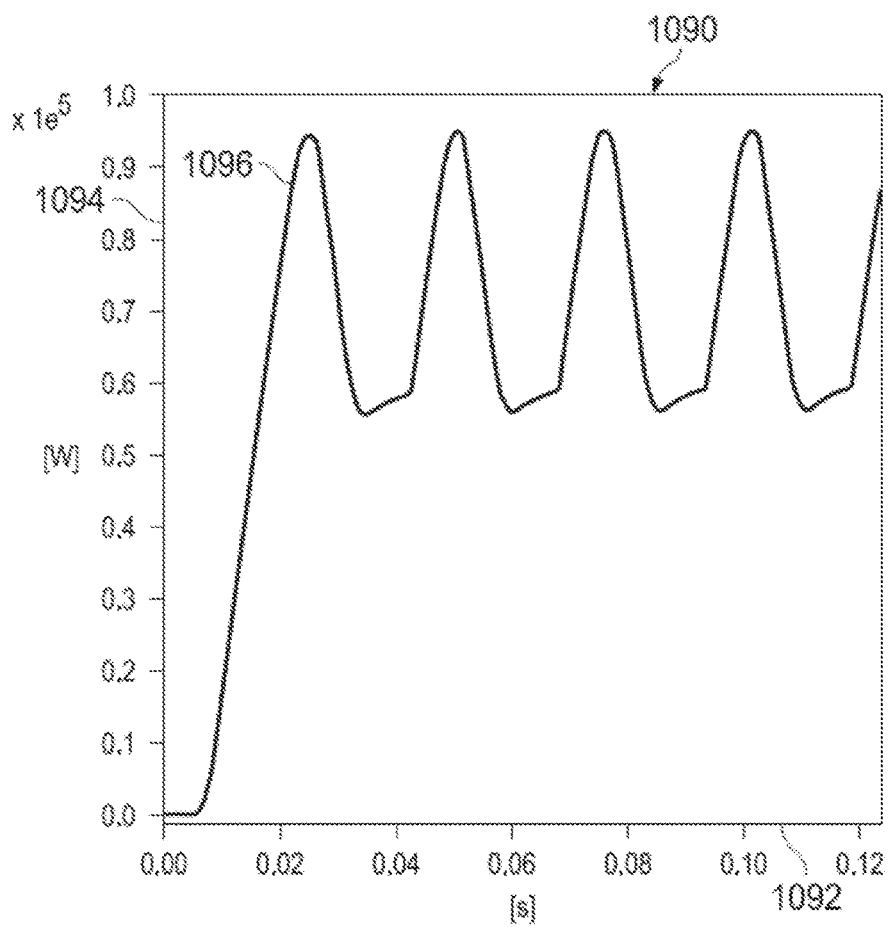

FIG. 10D contains the graph 1090, which shows the output inductor 386 output power. The graph 1090 shows a power signal 1096 (as measured at the dashed line 316 of FIG. 3) as a function of time (on x-axis 1092) and voltage (on y-axis 1094). The power displays periodicity on the order of approximately 0.02 sec, after an initial ramp up period beginning at time zero. The power signal exhibits periods of approximately 55 kW output and periods of approximately 95 kW output, alternating on the order of the wave envelope periodicity.

The output inductor 386 removes the high frequency signal present in the voltage and current at other points in the PCS 200 system, e.g. at the dashed lines 302, 304, 306, 308, 310, 312, and 314. The pulse power electrodes experience the output from the PCS 200 as a high voltage, high power quasi-DC voltage and current source.

Returning to circuit diagram 300 of FIG. 3, in various embodiments, the switch 392 is configured to control the electrical coupling between the electrical outputs from PCS 200 and the additional downstream modules of the pulse power drilling assembly, which includes one or more electrodes. In various embodiments, the switch 392 is coupled in series with the output of the output inductor 386. In various embodiments, the switch 392 is configured to remain closed unless a fault condition, such as a short circuit, over voltage, etc., is detected in the PCS 200 or other circuitry. In that case, a detected fault may be used as a trigger to open the switch 392 In various embodiments, the switch 392 may be controlled to open when the circuitry powering the one or more electrodes of the pulse power drilling assembly are fully charged in order to protect the PCS 200 from the discharge effects of the pulse power electrodes. If the pulse power electrodes are discharged when in electrical contact with the PCS 200, the PCS 200 may suffer electrical load shock or upstream capacitive discharge. In various embodiments, the switch 392 may be configured to open based a predetermine time interval. In various embodiments, the switch 392 may be configured to default to an open position, and to close when a difference in voltage is detected between the output of the output inductor 386 and (for example) the capacitive elements of the pulsed power unit used to control the pulse power applied to the electrode(s) of the pulse power drilling assembly.

Figure 11A:
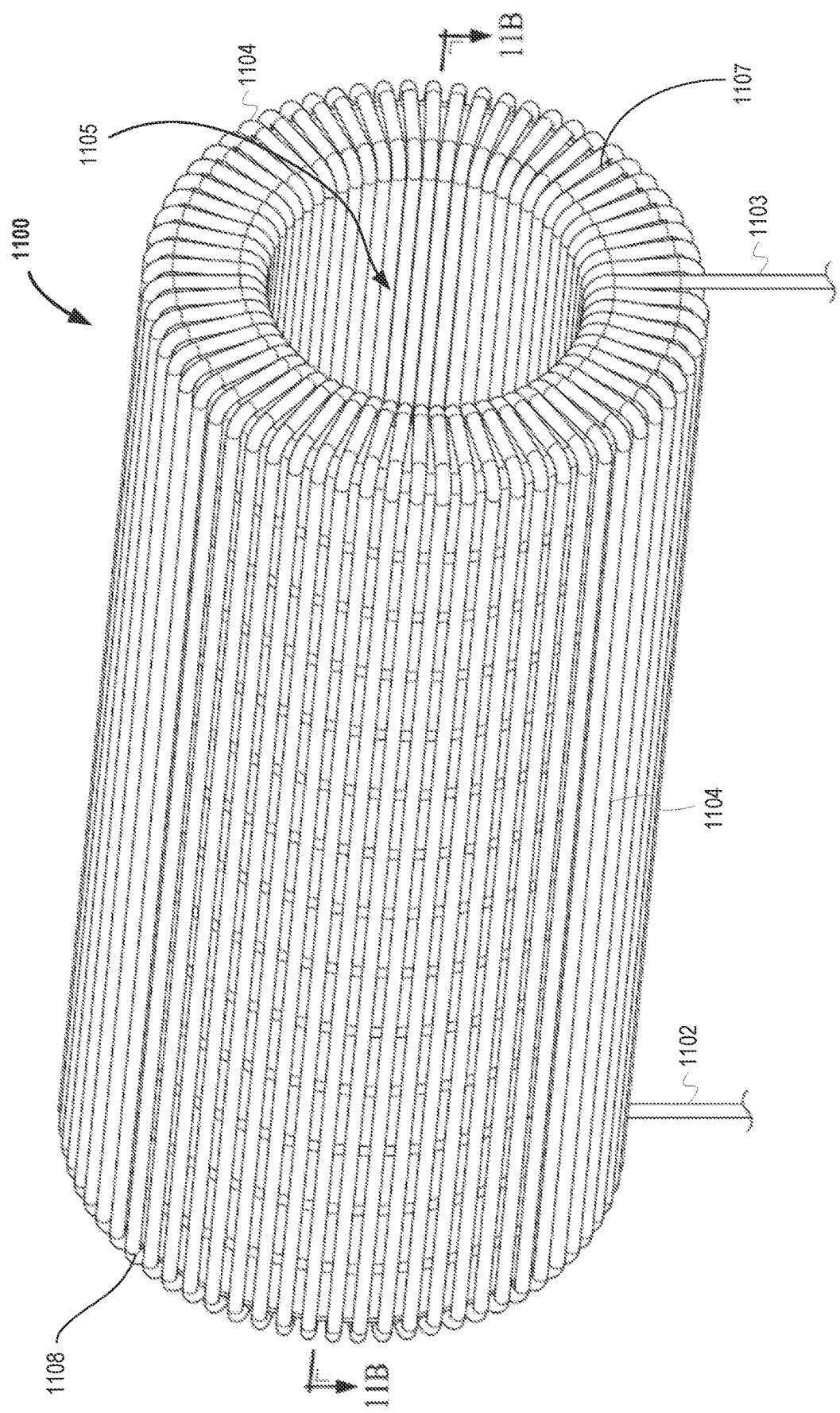
FIGS. 11A and 11B depict embodiments of the output inductor.
Figure 11B:
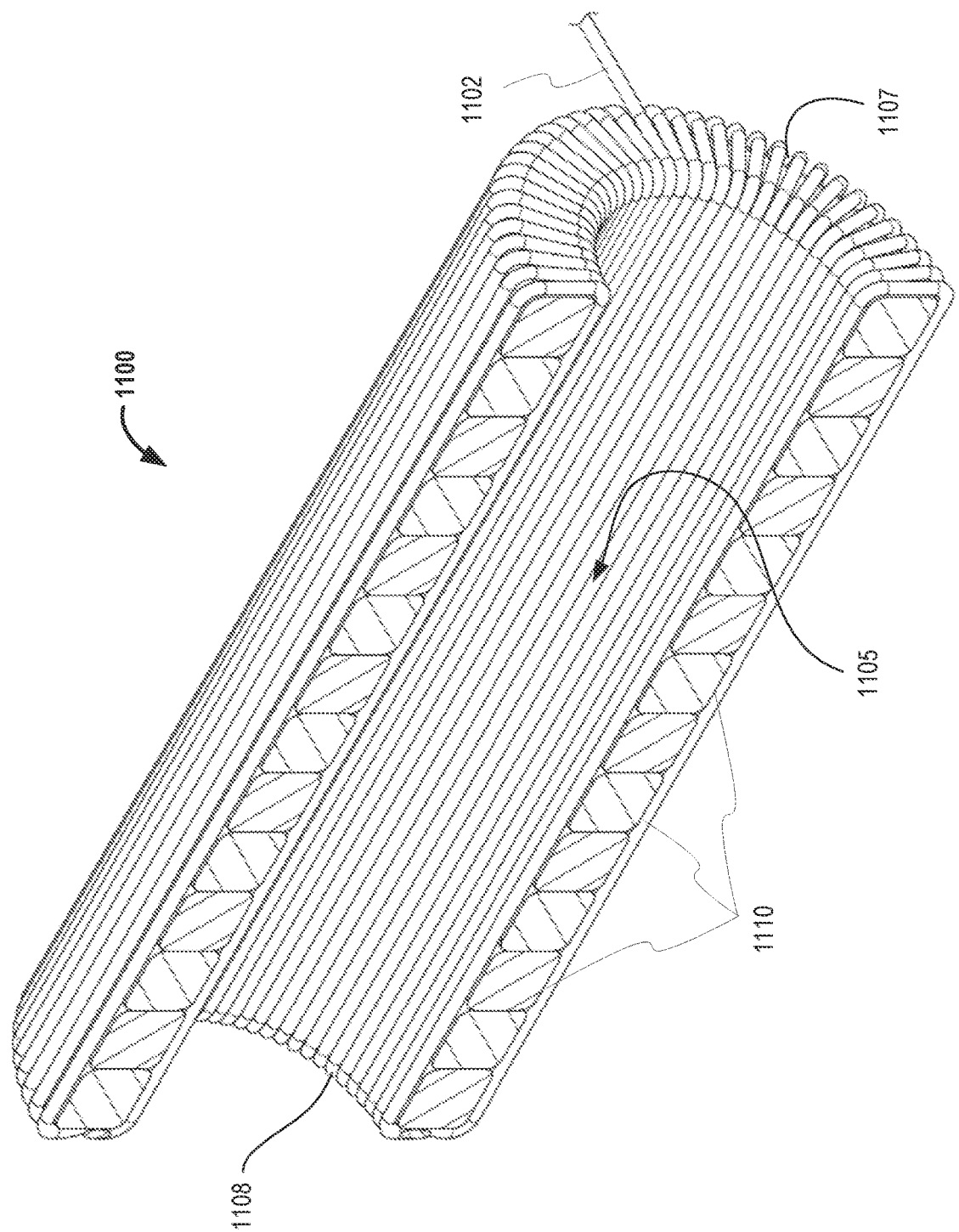

FIGS. 11A and 11B depict embodiments of the output inductor. FIG. 11A depicts an embodiment of a toroidal output inductor. FIG. 11B depicts a cross section of the toroidal output inductor of FIG. 11A. Operations and components of FIGS. 11A-11B are described in reference to the example PCS 200 of FIG. 2 and the circuit diagram 300 of FIG. 3.

FIGS. 11A-11B depict inductor 1100. In various embodiments, inductor 1100 depicts the configuration of the output inductor 242 of the PCS 200 of FIG. 2, and/or the output inductor 386 of the circuit diagram 300 of FIG. 3. The inductor 1100 has at least two electrical connections 1102, which may be an electrical input or an electrical output. In one or more embodiments, the inductor 1100 is symmetrical with respect to electrical connections. In various embodiments, the inductor 1100 is comprised of multiple windings 1104, where the windings 1104 may be of an electrical conductor, such as Litz wire, or an electrical conductor coated and enclosed within an electrical insulator (such as an epoxy), and/or may comprise a braided or multistrand conductor, and may comprise one or more layers of windings.

In various embodiments, inductor 1100 comprises a toroidal shape, having an inner cylindrical cavity 1105. In various embodiments, each of the windings 1104 may extend along an outer surface of the toroidal shape in a direction that is parallel to and at a same radial distance away from a longitudinal axis of the toroidal shape. Each winding may extend across an end edge (1107, 1108) of the toroidal shape, and then continue to extend in a direction that is parallel to at a radial distance from the longitudinal axis of the toroidal shape, passing through the inner cylindrical cavity 1105. The inner cylindrical cavity 1105 is configured to receive the center flow tube such that the center flow tube 262 can pass through the inner cylindrical cavity and extend beyond the ends of the toroid of the inductor 1100. Thus, the inner cross-sectional diameter of the toroidal shape (including the portion of windings 1104 the extend through the inner cavity passageway 1105) must be at least large enough to accommodate the center flow tube.

In various embodiments, the center flow tube 262 may be in physical contact with the electrical conductor of the windings 1104 or with the electrical insulator coating the electrical conductor of the windings 1104. In various embodiments, the center flow tube 262 may be additionally physically separated from the electrical conductor of the windings 1104 by an insulating or non-magnetic layer, such as insulating fiberglass wool, Teflon, etc. In various embodiments, the outer skin 260 of the tool body may be in physical contact with the electrical conductor of the windings 1104 or with the electrical insulator coating the electrical conductor of the windings 1104 along the outer portions of inductor 1100. In various embodiments, the outer skin 260 of the tool body may be physically separated from the electrical conductor of the windings 1104 by an insulating or non-magnetic layer, such as insulating fiberglass wool, Teflon, etc.

The cross section of FIG. 11B depicts multiple inductor cores 1110. In various embodiments, the inductor cores 1110 may be low magnetic permeability inductor cores. In various embodiments, the inductor cores 1110 comprises cores of Kool Mu, xFlux, etc. In various embodiments, the inductor cores 1110 comprises a powder core or a ferrite core. In various embodiments, the inductor cores 1100 can comprise fifteen inductor cores 1110 surrounded by one layer of windings 1104. Alternatively, the inductor 1100 may comprise six inductor cores 1110 surrounded by two layers of windings 1104. Alternative geometries for the inductor cores 1110 and windings 1104 are permissible based on the required form factor and electrical characteristics. In one or more embodiments, the center flow tube 262 has a smaller radius when passing through the inductor 1100 than in one or more other sections of the PCS 200.

Figure 12:
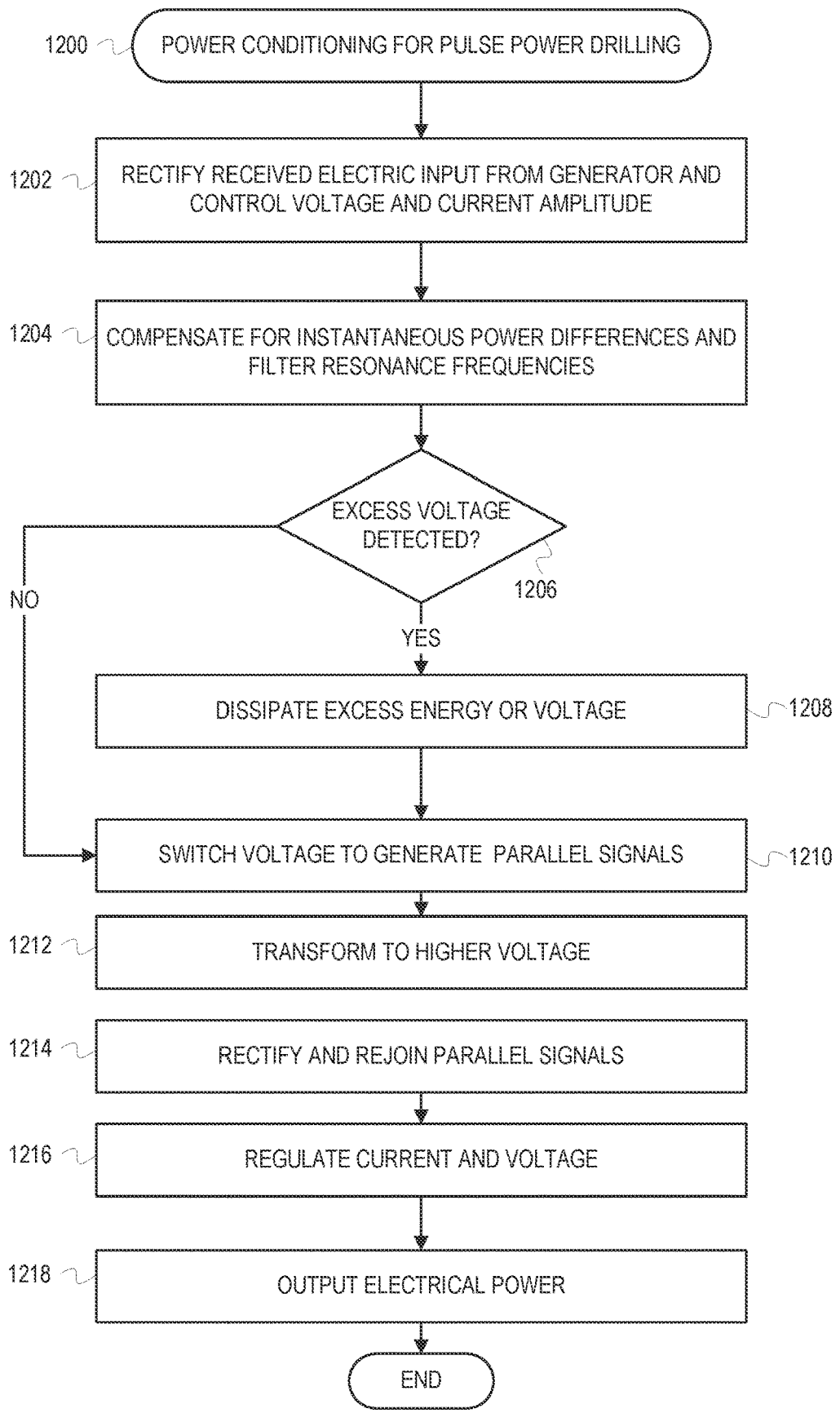
FIG. 12 is a flowchart of a method including operations for conditioning electrical power for use in pulse power drilling operations using a power conditioning system, according to various embodiments.

FIG. 12 is a flowchart of a method 1200 including operations for conditioning electrical power for use in pulse power drilling operations using a power conditioning system, according to various embodiments. A flowchart 1200 of FIG. 12 includes operations described in reference to the PCS 200 of FIG. 2 and the circuit diagram 300 of FIG. 3, for consistency with earlier descriptions. However, program code naming, organization, and deployment can vary due to arbitrary programmer choice, programming language(s), platform, etc. The depiction of the blocks of flowchart in FIG. 12 should not be interpreted as requiring all the operations in the block depicted, or the operations in the order depicted.

At block 1202, embodiments of method 1200 include rectifying electrical power received as an electrical output from a generator of a pulse power drilling assembly. The generator can further comprise an alternator and turbine, or be in communication with those elements. In various embodiments, rectifying the electrical power comprises manipulating the polarity and amplitude of the voltage waveform(s) of the received electrical power. In various embodiments, the received electrical power comprises a triphasic electric input received from the alternator, which may be rectified and controlled to within both an allowable voltage range and an allowable current range. In various embodiments, the rectification may be performed by the AFEC 202 of FIG. 2. In various embodiments, method 1200 continues to block 1204.

At block 1204, embodiments of method 1200 include compensating the rectified power for instantaneous power differences and filtering the rectified power to filter one or more resonance frequencies. For example, instantaneous power differences can be compensated for with a charge stored in the one or more capacitor 224. Filtering the one or more resonance frequency can include attenuating or otherwise removing or reducing the one or more resonance frequency. In various embodiments, the one or more resonant frequencies may be filtered (removed) with an inductor operating between parallel sections of the one or more capacitors of the DC link 204 of FIG. 2. Together, the one or more capacitors 224 and the inductor of the DC link 204 may function as a bandpass filter to remove resonance frequencies, or other high-frequency signals (such as those induced by the SAB 338 of the circuit diagram 300 of FIG. 3). In various embodiments, method 1200 continues to block 1206.

At block 1206, embodiments of method 1200 include checking a voltage at any one of the components of FIG. 3, including at any one of the sensors 303 to determine if excess voltage is detected. In various embodiments, the voltage is checked at the DC link 324 or the dynamic brake 326 of the PCS 200 as shown in FIG. 3. Excess voltage can be measure at any of the dashed lines 302, 304, 306, 308, 310, 312, 314, or 316 of FIG. 3. If excess voltage is detected ("YES" arrow extending from block 1206), embodiments of method 1200 continue to block 1208. In the alternative, if excess voltage is not detected ("NO" arrow at block 1206), embodiments of method 1200 continue to block 1210. In various embodiments, excess voltage can be determined based on a comparison of the checked voltage to a pre-determined allowable voltage range, a pre-determined allowable power range, or any other pre-determined range or set of one or more pre-determined limits on voltage, power, or current.

At block 1208, embodiments of method 1200 include dissipating excess energy or voltage. In various embodiments, the excess energy may be dissipated over a resistive load, such as resistor 372 of the dynamic brake 206 of FIG. 2, or of the dynamic brake 326 of FIG. 3. In various embodiments, dissipating excess energy comprises activation of the dynamic brake, activating a switch, such as a FET, that is in turn coupled to a conductor where the excess voltage has been detected in the resistive load. In various embodiments, activation of the dynamic brake or energy or voltage dissipation at the dynamic brake may trigger one or more shutdown or diagnostic routines. A shutdown or diagnostic routine can be triggered if the excess energy or power detected exceeds maximum voltage dissipation limits or ranges, power dissipation limits or ranges, or current dissipation limits or ranges. In various embodiments, one or more controller, such as the controller 301 of FIG. 1 can determine that a shutdown or diagnostic routine has been triggered based on the input of the sensors 303 of FIG. 3. In various embodiments, method 1200 optionally continues to block 1210. In various embodiments, the method 1200 can continue to block 1210 based on a determination of the controller 301 of FIG. 3 based on input from the sensor 303 of FIG. 3.

At block 1210, embodiments of method 1200 include switching electrical voltage to generate alternate and phase shifted signals. For example, a DC current can be switched to generate parallel pulsed square waves by the SAB 338 of FIG. 3. The current may be split into parallel currents in order to reduce the total energy travel over each of the parallel paths used by the assembly components carrying the respective parallel signals. In various embodiments, the electrical current is switched at a switching frequency of the SAB 338, which in various embodiments may be in a range from 80 to 100 kHz, inclusive. In various embodiments, the switching allows for voltage waveforms that may be transformed from a first voltage to a second and higher voltage by the booster transformer 328 of FIG. 3. In various embodiments, method 1200 continues to block 1212.

At block 1212, embodiments of method 1200 include transforming the voltage from each of the parallel signals generated at block 1210 to a higher voltage. For example, the voltage from each of the parallel signals may be transformed to a high voltage signal by the booster transformer 328, including the individual transformers 380, of FIG. 3. The transformers 380 can be HVHF transformers, which generate high frequency and high voltage signals where high frequency means that frequency is increased relative to the input and high voltage means that voltage is increased relative to the input. In various embodiments, the booster transformer 328 may comprise two HVHF transformers in parallel. In various embodiments, method 1200 continues to block 1214.

At block 1214, embodiments of method 1200 include separately rectifying each of the parallel signals, and rejoining the rectified parallel signals. For example, the parallel square wave signals can be rectified and rejoined by the diode bridge 348 of FIG. 3 to form a single DC signal with both a first frequency and a second slower frequency signal. In various embodiments, method 1200 continues to block 1216.

At block 1216, embodiments of method 1200 include regulating the current and voltage signals provided by the rectification and rejoining of the parallel signals. For example, the output inductor 386 of FIG. 3 can smooth and eliminate high frequency components of the current and voltage signals, such as those induced by the switching frequency of the SAB 338 of FIG. 3. In various embodiments, method 1200 continues to block 1218.

At block 1218, embodiments of method 1200 include outputting the conditioned electrical power from the power conditioning system. For example, conditioned electrical power may be transmitted as electric power from the PCS 200 of FIG. 2 to the pulse power unit of the pulse power assembly where the power conditioning system is located. In various embodiments, the output or transmission of the conditioned electrical power may be controlled by the switch 392 of FIG. 3. The power conditioning of the received electrical power from the alternator of the pulse power drilling assembly may be considered to have been completed once the conditioned electrical power is output from the power conditioning system, such as PCS 200. However, it would be understood that the conditioning of electrical power as described above with respect to the various embodiments of method 1200 may be performed on a continuous basis as the alternator of the pulse power drilling assembly continues to produce an electrical power output that is then received by the power conditioning system.

Any flowchart(s) provided as part of this disclosure are intended to aid in understanding the illustrations and is not to be used to limit scope of the claims. The flowchart(s) depict example operations that can vary within the scope of the claims. Additional operations may be performed; fewer operations may be performed; the operations may be performed in parallel; and the operations may be performed in a different order. For example, the operations depicted in blocks 1204 and 1208 can be performed in parallel or concurrently. With respect to FIG. 12, a triphasic electric input is not necessary. It will be understood that each block of the flowchart illustrations and/or block diagrams, and combinations of blocks in the flowchart illustrations and/or block diagrams, may be controlled by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 13:
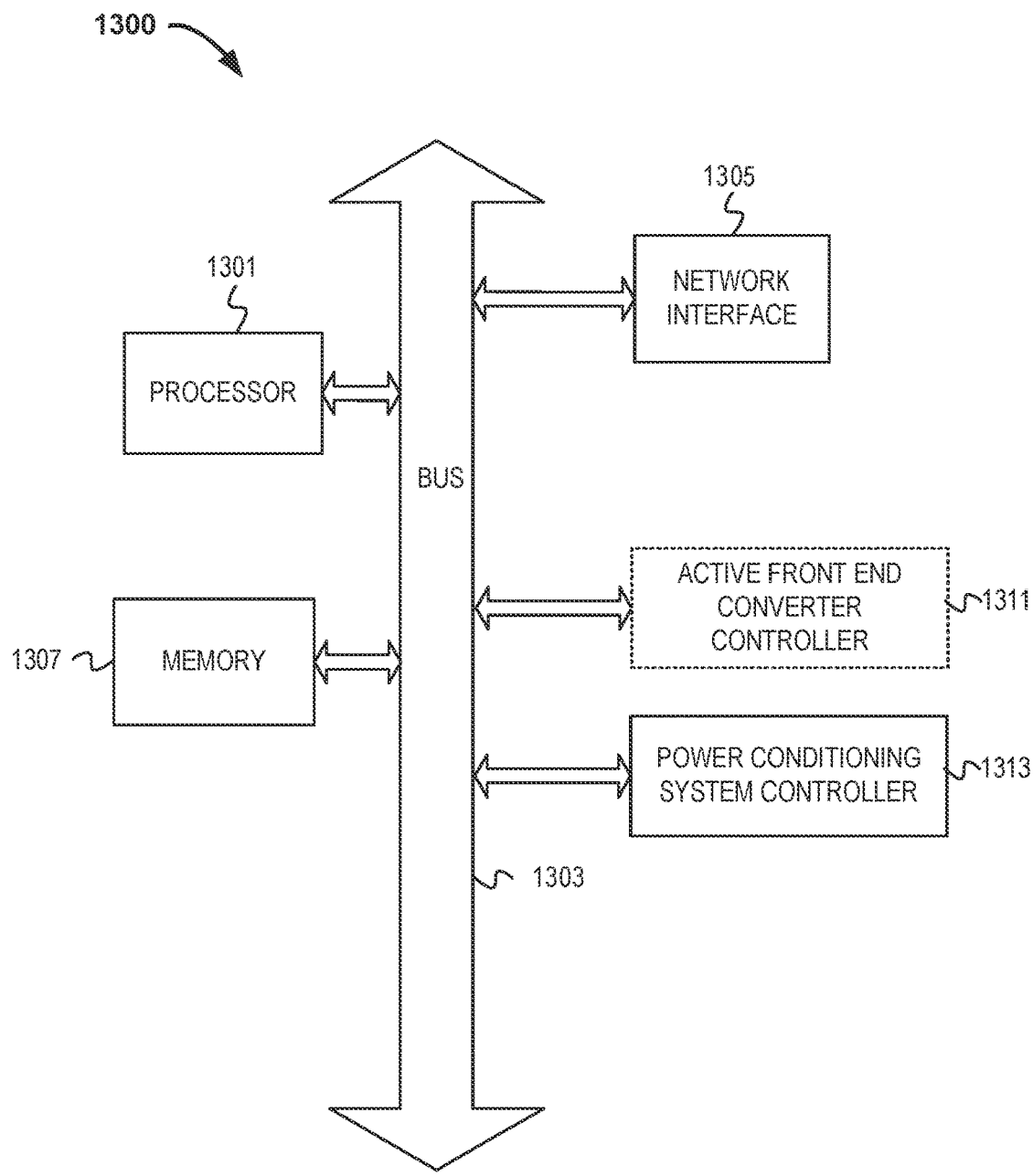
FIG. 13 depicts a computer system for a power conditioning system, according to various embodiments.

FIG. 13 depicts a computer system 1300 for a power conditioning system, according to various embodiments. As illustrated in FIG. 13, computer system 1300 includes a processor 1301 (possibly including multiple processors, multiple cores, multiple nodes, and/or implementing multithreading, etc.), a computer memory 1307. The memory 1307 may be system memory. or any one or more of the above already described possible realizations of machine-readable media. computer system 1300 also includes a bus 1303 and a network interface 1305. In various embodiments, memory 1307 is communicatively coupled to processor 1301 through bus 1303. In alternative embodiments, memory 1307 may be coupled directly to processor 1301, or may be an integral part of processor 1301.

In various embodiments, computer system 1200 includes a power conditioning system controller 1313, and optionally an active front end converter (AFEC) controller 1311. The power conditioning system controller 1313 may be configured to control one or more component of the power conditioning system, including one or more FET and one or more switches of a power conditioning system, such as PCS 200 (FIG. 2). The power conditioning system controller 1313 optionally controls frequencies, voltages, and currents of one or more components of the power conditioning system. The AFEC controller 1311 may be configured to control one or more component of the AFEC, which may include one or more FETs or one or more switches. The AFEC controller 1311 may optionally be part of the power conditioning system controller 1313, may be in communication with the power conditioning system controller 1313, or may optionally be autonomous from the power conditioning system controller 1313. Any one of the previously described functionalities may be partially (or entirely) implemented in hardware and/or on the processor 1301. For example, the functionality may be implemented with an application specific integrated circuit, in logic implemented in the processor 1301, in a co-processor on a peripheral device or card, etc. Further, realizations may include fewer or additional components not illustrated in FIG. 13, (e.g., video cards, audio cards, additional network interfaces, peripheral devices, etc.). The processor 1301, and the network interface 1305, the active front end converter controller 1311, and the power conditioning system controller are coupled to the bus 1303, and are configured to communicate with one or more of these other components of computer system 1300 through bus 1303.

While the aspects of the disclosure are described with reference to various implementations and exploitations, it will be understood that these aspects are illustrative and that the scope of the claims is not limited to them. In general, techniques for power conditioning as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Embodiment 1: A method comprising: receiving at a power conditioning system positioned within a pulse power drilling assembly an electrical power output generated by an alternator operating within the pulse power drilling assembly as part of a pulse power drilling operation; and conditioning, using the power conditioning system, the received electrical power output to generate a conditioned electrical power output to be coupled to a pulse power unit of the pulsed power drilling assembly, wherein conditioning the received electrical power output comprises: rectifying electrical power output to generate a rectified power output, transforming a voltage level of one or more waveforms included in the rectified power output to one or more higher voltage levels, and outputting a conditioned electrical power output comprising the one or more higher voltage levels to the pulsed power unit.

Embodiment 2: The method of embodiment 1, wherein transforming a voltage level of one or more waveforms included in the rectified power output to one or more higher voltage levels comprises: switching the one or more waveforms at a first frequency to create at least one square wave signal; and transforming a voltage level of the at least one square wave signal to one or more higher voltage levels.

Embodiment 3: The method of embodiment 2, switching the one or more waveforms at a first frequency to create at least one square wave signal comprises: splitting the one or more waveforms into two parallel signals; switching each of the two parallel signals at a first frequency to create at least one square wave signal; transforming a voltage level of each of the two parallel signals to the one or more higher voltage levels; and rejoining the two parallel signals at the one or more higher voltage levels.

Embodiment 4: The method of embodiment 2 or 3, further comprising: rectifying the at least one square wave signal at the one or more higher voltage levels.

Embodiment 5: The method of any one of embodiments 1 to 4, wherein outputting a conditioned electrical power output further comprises: regulating the conditioned electrical power output, and wherein regulating comprises at least one of inductive smoothing and frequency filtering at least one of a current, a voltage, and a power.

Embodiment 6: The method of any one of embodiments 1 to 5, wherein conditioning the received electrical power output further comprises: detecting at least one of an excess of current, an excess of voltage, and an excess of power; and when the at least one of the excess of current, the excess of voltage, and the excess of power is detected, at least one of dissipating the excess of current, limiting the excess of voltage, and dissipating the excess of power.

Embodiment 7: The method of any one of embodiments 1 to 6, wherein conditioning the received electrical power output further comprises: compensating for instantaneous imbalances between the received electrical power output and the conditioned electrical power output.

Embodiment 8: The method of embodiment 7, wherein compensating for instantaneous imbalances between the received electrical power output and the conditioned electrical power output comprises at least one of inductively compensating and capacitively compensating.

Embodiment 9: The method of any one of embodiments 1 to 8, wherein conditioning the received electrical power output further comprises: removing one or more frequencies from at least one of the received electrical power output and the conditioned electrical power output, and wherein removing the one or more frequencies comprises at least one of bandpass frequency filtering, inductively filtering, and capacitively filtering.

Embodiment 11: An apparatus comprising: a power conditioning system configured to be physically positioned downhole within a borehole as part of a pulsed power drilling assembly, the power conditioning system configured to receive electrical power generated by an alternator of the pulsed power drilling assembly, and to provide an output comprising conditioned electrical power, wherein the power conditioning system comprises: an active front-end converter (AFEC) module configured to receive the electrical power generated by the alternator, and to perform rectification of the received electrical power to generate a rectified electrical power; a booster converter module coupled with the AFEC module, the booster converter module configured to receive the rectified electrical power, and to boost a voltage level of the rectified electrical power to generate a boosted voltage electrical power; and an output inductor module coupled with the booster converter module, the output inductor module configured to perform voltage regulating of the boosted voltage electrical power to generate the conditioned electrical power.

Embodiment 11: The apparatus of embodiment 10, wherein the power conditioning system further comprises: a direct current (DC) link module coupled with the AFEC module, the DC link module configured to receive the rectified electrical power and to remove high frequency oscillations, and wherein the booster converter module is coupled with the AFEC module through the DC link module.

Embodiment 12: The apparatus of embodiment 11, wherein the power conditioning system further comprises: a dynamic brake module coupled with the DC link module, the dynamic brake module configured to: receive the rectified electrical power and to detect at least one of an excess of current, an excess of voltage, and an excess of power; and when the at least one of the excess of current, the excess of voltage, and the excess of power is detected, at least one of dissipate the excess of current, limiting the excess of voltage, and dissipating the excess of power, and wherein the booster converted module is coupled with the AFEC module through the DC link module and the dynamic brake module.

Embodiment 13: The apparatus of any one of embodiments 10 to 12, wherein the booster converter module further comprises: a single active bridge (SAB) module coupled with the AFEC module, the SAB module configured to: receive the rectified electrical power; and switch a current of the rectified electrical power at a first frequency to create at least one square wave signal; and a diode bridge module coupled with the booster converter module, the diode bridge module configured to: rectify the boosted voltage electrical power, wherein the booster converter is configured to boost the voltage level of the rectified electrical power switched at the first frequency, and wherein the output inductor module is coupled with the diode bridge module.

Embodiment 14: The apparatus of any one of embodiments 10 to 13, wherein the booster converter module further comprises: a high voltage high frequency transformer (HVHF) module coupled with the AFEC module and the output inductor module, the HVHF module configured to: switch a current of the rectified electrical power from a first frequency to a second faster frequency; and boost the voltage level to of the rectified electrical power from a first voltage to a second higher frequency.

Embodiment 15: The apparatus of embodiment 14, wherein the booster converter module further comprises a second HVHF module, and wherein the HVHF module and the second HVHF module are electrically in parallel.

Embodiment 16: A non-transitory, computer-readable medium having instructions stored thereon that are executable by a computing device to perform operations comprising instruction to: condition, using the power conditioning system, received electrical power output received at a power conditioning system positioned within a pulse power drilling assembly to generate a conditioned electrical power output to be coupled to a pulse power unit of the pulsed power drilling assembly, wherein the received electrical power is generated by an alternator operating within the pulse power drilling assembly as part of a pulse power drilling operation, and wherein instructions to condition the received electrical power output comprises instructions to, rectify electrical power output to generate a rectified power output, transform a voltage level of one or more waveforms included in the rectified power output to one or more higher voltage levels, and output a conditioned electrical power output comprising the one or more higher voltage levels to the pulsed power unit.

Embodiment 17: The non-transitory, machine readable medium of embodiment 16, wherein instruction to transform a voltage level of one or more waveforms included in the rectified power output to one or more higher voltage levels comprise instruction to: switch the one or more waveforms at a first frequency to create at least one square wave signal; and transform a voltage level of the at least one square wave signal to one or more higher voltage levels.

Embodiment 18: The non-transitory, machine readable medium of embodiment 17, wherein instructions to switch the one or more waveforms at a first frequency to create at least one square wave signal comprise instruction to: split the one or more waveforms into two parallel signals; switch each of the two parallel signals at a first frequency to create at least one square wave signal; transform a voltage level of each of the two parallel signals to the one or more higher voltage levels; and rejoin the two parallel signals at the one or more higher voltage levels.

Embodiment 19: The non-transitory, machine readable medium of embodiment 17 or 18, further comprising instructions to: rectify the at least one square wave signal at the one or more higher voltage levels Embodiment 20: The non-transitory, machine readable medium of any one of embodiments 16 to 19, wherein instructions to output a conditioned electrical power output further comprise instructions to: regulate the conditioned electrical power output, and wherein regulating comprises at least one of inductive smoothing and frequency filtering at least one of a current, a voltage, and a power.

Embodiment 21: The non-transitory, machine readable medium of any one of embodiments 16 to 20, wherein instructions to condition the received electrical power output further comprise instruction to: detect at least one of an excess of current, an excess of voltage, and an excess of power; and when the at least one of the excess of current, the excess of voltage, and the excess of power is detected, at least one of dissipate the excess of current, limit the excess of voltage, and dissipate the excess of power.

Embodiment 22: The non-transitory, machine readable medium of any one of embodiments 16 to 21, wherein instructions to condition the received electrical power output further comprise instruction to: compensate for instantaneous imbalances between the received electrical power output and the conditioned electrical power output.

Embodiment 23: The non-transitory, machine readable medium of embodiment 22, wherein instructions to compensate for instantaneous imbalances between the received electrical power output and the conditioned electrical power output comprise instructions to at least one of inductively compensate and capacitively compensate.

Embodiment 24: The non-transitory, machine readable medium of any one of embodiments 16 to 23, wherein instructions to condition the received electrical power output further comprise instruction to: remove one or more frequencies from at least one of the received electrical power output and the conditioned electrical power output, and wherein instruction to remove the one or more frequencies comprise instruction to at least one of, bandpass frequency filter, inductively filter, and capacitively filter.

Terminology

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:
receiving, at a power conditioning system positioned within a pulse power drilling assembly, an electrical power output generated by an alternator operating within the pulse power drilling assembly as part of a pulse power drilling operation; and
conditioning, using the power conditioning system, the received electrical power output to generate a conditioned electrical power output to be coupled to a pulse power unit of the pulsed power drilling assembly, wherein conditioning the received electrical power output comprises:
rectifying the electrical power output to generate a rectified power output,
splitting a waveform of the rectified power output into two parallel signals,
transforming a voltage level of each of the two parallel signals to one or more higher voltage levels,
rejoining the two parallel signals at the one or more higher voltage levels, and
outputting a conditioned electrical power output comprising the one or more higher voltage levels to the pulsed power unit.

2. The method of claim 1, further comprising:
rectifying the rejoined signal at the one or more higher voltage levels.

3. The method of claim 1, wherein outputting the conditioned electrical power output further comprises:
regulating the conditioned electrical power output, and wherein the operation of regulating comprises inductive smoothing and frequency filtering of at least one of a current, a voltage, or a power.

4. The method of claim 1, wherein the operation of conditioning the received electrical power output further comprises:
   detecting at least one of an excess of current, an excess of voltage, and an excess of power; and
   when the at least one of the excess of current, the excess of voltage, and the excess of power is detected,
      at least one of dissipating the excess of current, limiting the excess of voltage, and dissipating the excess of power.

5. The method of claim 1, wherein conditioning the received electrical power output further comprises:
   compensating for instantaneous imbalances between the received electrical power output and the conditioned electrical power output.

6. The method of claim 5, wherein compensating for instantaneous imbalances between the received electrical power output and the conditioned electrical power output comprises at least one of inductively compensating and capacitively compensating.

7. The method of claim 1, wherein conditioning the received electrical power output further comprises:
   removing one or more frequencies from at least one of the received electrical power output and the conditioned electrical power output, and wherein removing the one or more frequencies comprises at least one of bandpass frequency filtering, inductively filtering, and capacitively filtering.

8. An apparatus comprising:
   a power conditioning system configured to be physically positioned downhole within a borehole as part of a pulsed power drilling assembly, the power conditioning system configured to receive electrical power generated by an alternator of the pulsed power drilling assembly, and to provide an output comprising conditioned electrical power,
   wherein the power conditioning system comprises:
      an active front-end converter (AFEC) module configured to receive the electrical power generated by the alternator, and to perform rectification of the received electrical power to generate a rectified electrical power;
      a booster converter module coupled with the AFEC module, the booster converter module configured to receive the rectified electrical power, split a waveform of the rectified power output into two parallel signals, transform a voltage level of each of the two parallel signals to one or more higher voltage levels, rejoin the two parallel signals at the one or more higher voltage levels to generate a boosted voltage electrical power; and
      an output inductor module coupled with the booster converter module, the output inductor module configured to perform voltage regulating of the boosted voltage electrical power to generate the conditioned electrical power.

9. The apparatus of claim 8, wherein the power conditioning system further comprises:
   a direct current (DC) link module coupled with the AFEC module, the DC link module configured to receive the rectified electrical power and to remove high frequency oscillations, and wherein the booster converter module is coupled with the AFEC module through the DC link module.

10. The apparatus of claim 9, wherein the power conditioning system further comprises:
   a dynamic brake module coupled with the DC link module, the dynamic brake module configured to:
      receive the rectified electrical power and to detect at least one of an excess of current, an excess of voltage, and an excess of power; and
      in response to detection of the at least one of the excess of current, the excess of voltage, and the excess of power, the power conditioning system to perform at least one of dissipation of the excess of current, limitation of the excess of voltage, and dissipation of the excess of power,
   and wherein the booster converted module is coupled with the AFEC module through the DC link module and the dynamic brake module.

11. The apparatus of claim 8, wherein the booster converter module is coupled with a diode bridge module, the booster converter module further comprising:
   a single active bridge (SAB) module coupled with the AFEC module, the SAB module configured to:
      receive the rectified electrical power; and
      switch a current of the rectified electrical power at a first frequency to create at least one square wave signal; and
   wherein the diode bridge module is configured to rectify the boosted voltage electrical power,
   wherein the booster converter is configured to boost the voltage level of the rectified electrical power switched at the first frequency, and
   wherein the output inductor module is coupled with the diode bridge module.

12. The apparatus of claim 8, wherein the booster converter module further comprises:
   a high voltage high frequency transformer (HVHF) module coupled with the AFEC module and the output inductor module, the HVHF module configured to:
      switch a current of the rectified electrical power from a first frequency to a second faster frequency; and
      boost the voltage level of the rectified electrical power from a first voltage to a second higher voltage.

13. The apparatus of claim 12, wherein the booster converter module further comprises a second HVHF module, and wherein the HVHF module and the second HVHF module are electrically in parallel.

14. One or more non-transitory machine-readable media comprising program code executable by a processor to cause the processor to:
   condition, using a power conditioning system, received electrical power output received at the power conditioning system positioned within a pulse power drilling assembly to generate a conditioned electrical power output to be coupled to a pulse power unit of the pulsed power drilling assembly,
   wherein the received electrical power is generated by an alternator operating within the pulse power drilling assembly as part of a pulse power drilling operation, and
   wherein the program code executable by the processor to cause the processor to condition the received electrical power output comprises program code executable by the processor to cause the processor to,
      rectify electrical power output to generate a rectified power output,
      split a waveform of the rectified power output into two parallel signals,
      transform a voltage level of each of the two parallel signals to one or more higher voltage levels, rejoin the two parallel signals at the one or more higher voltage levels, and output a conditioned electrical power output comprising the one or more higher voltage levels to the pulsed power unit.

15. The one or more non-transitory machine-readable media of claim 14, wherein the program code comprises program code executable by the processor to cause the processor to:
rectify the at least one square wave signal at the one or more higher voltage levels.

16. The one or more non-transitory machine-readable media of claim 14, wherein the program code executable by the processor to cause the processor to output the conditioned electrical power output comprises program code executable by the processor to cause the processor to:
regulate the conditioned electrical power output, and wherein regulation of the conditioned electrical power output comprises inductive smoothing and frequency filtering at least one of a current, a voltage, or a power.

* * * * *